(12) United States Patent
Honda et al.

(10) Patent No.: US 9,182,619 B2
(45) Date of Patent: Nov. 10, 2015

(54) LIQUID CRYSTAL DISPLAY DEVICE HAVING A TRANSPARENT SUBSTRATE AND A FUSION BONDING LAYER

(75) Inventors: Makoto Honda, Tokyo-to (JP);
Norinaga Nakamura, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 373 days.

(21) Appl. No.: 13/582,863

(22) PCT Filed: Oct. 27, 2010

(86) PCT No.: PCT/JP2010/069099
§ 371 (c)(1),
(2), (4) Date: Sep. 5, 2012

(87) PCT Pub. No.: WO2011/108140
PCT Pub. Date: Sep. 9, 2011

(65) Prior Publication Data
US 2012/0327341 A1   Dec. 27, 2012

(30) Foreign Application Priority Data
Mar. 5, 2010   (JP) ................................ 2010-049643

(51) Int. Cl.
*G02F 1/1333* (2006.01)
(52) U.S. Cl.
CPC .............. *G02F 1/133308* (2013.01); *G02F 2001/133331* (2013.01); *G02F 2201/503* (2013.01)
(58) Field of Classification Search
USPC ............... 349/112, 122, 158, 160, 60, 84, 96
See application file for complete search history.

(56) References Cited

U.S. PATENT DOCUMENTS

| | | | |
|---|---|---|---|
| 7,884,904 B2 * | 2/2011 | Wada | 349/122 |
| 2006/0246233 A1 | 11/2006 | Fukuda | |
| 2008/0018831 A1 * | 1/2008 | Yano et al. | 349/96 |
| 2010/0014034 A1 * | 1/2010 | Matsuhira | 349/122 |
| 2010/0277684 A1 * | 11/2010 | Fukushima et al. | 349/158 |
| 2010/0328583 A1 * | 12/2010 | Hiruma et al. | 349/96 |

FOREIGN PATENT DOCUMENTS

| | | | |
|---|---|---|---|
| JP | 08-327975 A | 12/1996 | |
| JP | 10-186397 A | 7/1998 | |
| JP | 2002-107750 A | 4/2002 | |
| JP | 2003-114766 A | 4/2003 | |
| JP | 2003-195018 A | 7/2003 | |
| JP | 2006-010748 A | 1/2006 | |
| JP | 2006-330705 A | 12/2006 | |
| JP | 2008-107404 A | 5/2008 | |
| JP | 2009-265593 A | 11/2009 | |
| JP | 2010-008475 A | 1/2010 | |
| JP | 2010-036502 A | 2/2010 | |

OTHER PUBLICATIONS

International Search Report: mailed Jan. 18, 2011; Appln. No. PCT/JP2010/069099.

* cited by examiner

*Primary Examiner* — Huyen Ngo
(74) *Attorney, Agent, or Firm* — Ladas & Parry LLP

(57) ABSTRACT

A liquid crystal display device having high impact resistance and good display properties is provided. The liquid crystal display device includes a liquid crystal panel, a transparent substrate having rigidity, and a fusion bonding layer including a thermoplastic resin, where the transparent substrate is bonded to a viewing-side surface of the liquid crystal display panel with the fusion bonding layer interposed therebetween.

34 Claims, 3 Drawing Sheets

LIQUID CRYSTAL DISPLAY DEVICE HAVING A TRANSPARENT SUBSTRATE AND A FUSION BONDING LAYER

FIELD OF THE INVENTION

The present invention relates to a liquid crystal display device having a protected surface and having high impact resistance as well as good display properties.

BACKGROUND ART

In general, the liquid crystal display device has a structure where the periphery of a liquid crystal panel is protected by a housing, the liquid crystal panel having liquid crystal sandwiched between two thin substrates on which members such as an alignment films and electrodes are formed, and the panel having functional films such as a light guide plate, a polarizer, and further an anti-glare film and an anti-reflection film piled in layers. On the display surface of the liquid crystal panel, a thin functional film is in an exposed state and, therefore, is vulnerable to external impact. When impact is applied to the liquid crystal panel, the liquid crystal panel may be destroyed, or alignment of the liquid crystals may become disordered and alignment defects may occur, resulting in deterioration of the display properties. Therefore, when conveying, transporting, or storing the liquid crystal display device and, further, when using the liquid crystal display device, impact resistance is required for the liquid crystal display device.

To cope with the foregoing problem, there has been proposed a technique which comprises placing a front substrate on the front surface of the liquid crystal panel, which protects the liquid crystal panel from the external impact. In this case, if an air layer is interposed between the liquid crystal panel and the front substrate, especially in a bright outdoor environment, light is reflected at the interface with the air layer and visibility is lowered.

Accordingly, there has been proposed a technique to simultaneously improve reliability against the external impact and outdoor visibility by adhering a protective member, the member comprising a toughened substrate such as toughened glass, and a low reflection layer formed on the toughened substrate to the front surface of the liquid crystal panel with an intermediate adhesive layer having a refractive index similar to those of the polarizer of the liquid crystal panel and the toughened substrate as the protective member (see, for example, Patent Literature 1).

CITATION LIST

Patent Document

[Patent Document 1] Japanese Patent Laid-Open Publication No. 2009-265593

SUMMARY OF INVENTION

Problem to be Solved by the Invention

According to the technique described in Patent Literature 1, the toughened substrate and the liquid crystal panel are bonded by placing an adhesive on the toughened substrate or the liquid crystal panel by using an ultraviolet curable pressure-sensitive adhesive, a thermosetting adhesive, or a transparent adhesive tape called OCA (Optical Clear Adhesive) as the adhesive layer having a refractive index similar to those of the polarizer of the liquid crystal panel and the toughened substrate as the protective member, superimposing the toughened substrate and liquid crystal panel, and curing or pressing the adhesive by ultraviolet irradiation or heating. However, when a curable adhesive is used, there arise problems such as uneven color due to distortion of the polarizer caused by strain in curing of the adhesive and protrusion of the adhesive from the edge portion. In contrast, when a transparent adhesive tape is used, there are problems such as difficulty in the positional alignment of the toughened substrate and the liquid crystal panel, air bubble entrainment during application of the tape, poor productivity due to going through an autoclaving process, and the like.

The present invention was made in view of the above-described problems and the main object thereof is to provide a liquid crystal display device having high impact resistance and good display properties.

Means for Solving the Problems

In order to solve the above-described problems, the present invention provides a liquid crystal display device comprising a liquid crystal panel, a transparent substrate having rigidity, and a fusion bonding layer comprising a thermoplastic resin, characterized in that the transparent substrate is bonded to a viewing-side surface of the liquid crystal panel with the fusion bonding layer interposed therebetween.

According to the present invention, as the transparent substrate having rigidity is bonded to the viewing-side surface of the liquid crystal panel with the fusion bonding layer interposed therebetween, the liquid crystal panel can be protected from external impact, and thereby making it possible to enhance impact resistance and to improve reliability. Furthermore, according to the present invention, as the fusion bonding layer comprises the thermoplastic resin, the thermoplastic resin can be molded into a sheet or a film, and the liquid crystal panel, the sheet-like or film-like fusion bonding layer, and the transparent substrate can be unified by bonding under pressure and heat, and thereby making it possible to bond the liquid crystal panel and the transparent substrate without causing lowering in the image quality.

In the above-described invention, the above-described transparent substrate is preferably a glass substrate. This is because the glass substrate can enhance not only the impact resistance but also abrasion resistance.

Also, in the present invention, a thickness of the above-described transparent substrate is preferably in a range of 0.5 mm to 4 mm. This is because, if the thickness of the transparent substrate is in the above-described range, rigidity and strength of the transparent substrate can be balanced with weight saving and thickness reduction of the liquid crystal display device.

Further, in the present invention, a thickness of the above-described fusion bonding layer is preferably in a range of 0.05 mm to 0.5 mm. If the thickness of the fusion bonding layer is in the above-described range, the thermoplastic resin can be molded in a sheet or film and it becomes possible to bond the liquid crystal panel and the transparent substrate using a sheet-like or film-like fusion bonding layer. Also, when the thickness of the fusion bonding layer is in the above-described range, adhesion of the liquid crystal panel and the transparent substrate can be balanced with weight saving and thickness reduction of the liquid crystal device.

Furthermore, in the present invention, the above-described fusion bonding layer preferably comprises a cross-linking agent. This is because the cross-linking agent can improve heat resistance of the fusion bonding layer after fusion bonding by heat.

Additionally, in the present invention, it is preferable to use, as the above-described fusion bonding layer, a sheet-like or film-like fusion bonding layer having a concave-convex shape on a surface. If there is a concave-convex shape on a surface of the sheet-like or film-like fusion bonding layer, air bubbles entrained during bonding of the liquid crystal panel and the transparent substrate can be released.

Further, in the present invention, it is preferable that a light diffusion layer is placed on the viewing side of the above-described liquid crystal panel. This is because of the following. By bonding the transparent substrate to the liquid crystal panel with the fusion bonding layer interposed therebetween, there occur cases where display defects due to the liquid crystal panel and a backlight unit become visually more recognizable. But by having the light diffusion layer placed on the viewing side of the liquid crystal panel, the visual defects can be made visually less recognizable.

In the above-described invention, the above-described light diffusion layer preferably comprises a light diffusion particle and a binder. This is because, when the light diffusion layer comprises the light diffusion particle, occurrence of glare (scintillation) can be prevented.

In the above-described case, a refractive index ratio of the above-described light diffusion particle and the above-described binder is preferably in a range of more than 1.000 and less than 1.020. If the refractive index ratio of the light diffusion particle and the binder is large, there are cases where the contrast decreases due to whitening. Therefore, it is preferable that the refractive index ratio of the light diffusion particle and the binder is as small as possible, even though the difference between refractive indices of the light diffusion particle and the binder is not zero. Especially, when the light diffusion layer comprises the light diffusion particle and, at the same time, possesses a concave-convex shape on a surface, lowering of the contrast can be reduced while preventing the glare if the refractive index ratio of the light diffusion particle and the binder is as small as possible.

In addition, the refractive index ratio of the light diffusion particle and the binder refers to a ratio of the larger refractive index to the smaller refractive index of the light diffusion particles and the binder.

Furthermore, in the above-described invention, it is also preferable that the above-described light diffusion layer has a concave-convex shape on a surface. This is because, when the light diffusion layer has a concave-convex shape on a surface as compared to when the light diffusion layer comprises the light diffusion particles, the lowering of the contrast due to whitening is less likely to occur despite a large refractive index ratio at the concave-convex interface.

Further, in the above-described invention, there may be placed a second fusion bonding layer comprising a thermoplastic resin and the above-described light diffusion layer sequentially between the above-described liquid crystal panel and the above-described fusion bonding layer. In this case, a commercial sheet-like or film-like light diffusion layer can be used, which enables economical manufacturing of the liquid crystal display device.

Also, in the above-described invention, it is preferable that the above-described light diffusion layer and the above-described second fusion bonding layer are in contact, that the above-described light diffusion layer has a concave-convex shape on a surface facing the second fusion bonding layer, and that a refractive index ratio of the material which constitutes the above-described light diffusion layer and the above-described thermoplastic resin contained in the above-described second fusion bonding layer is in a range of 1.010 or more and less than 1.300. This is because, if the refractive index ratio is less than the above-described range, diffusion due to the interfacial concave-convex shape between the light diffusion layer and the second fusion bonding layer becomes small, thus inviting a fear of occurrence of unevenness defects; also, when the refractive index ratio is the above-described range or more, there is a fear that the contrast is lowered due to reflection of the external light at the interfacial concave-convex shape between the light diffusion layer and the second fusion bonding layer.

In addition, the refractive index ratio of the material constituting the light diffusion layer and the thermoplastic resin contained in the second fusion bonding layer refers to a ratio of the larger refractive index to the smaller refractive index of the material constituting the light diffusion layer and the thermoplastic resin contained in the second fusion bonding layer.

Further, in the above-described invention, it is also preferable that the above-described light diffusion layer comprises a highly-refractive ultrafine particle or a low-refractive ultrafine particle. This is because, when the light diffusion layer comprises the highly-refractive ultrafine particle or the low-refractive ultrafine particle, the refractive index of the material which constitutes the light diffusion layer can be adjusted.

Also, in the above-described invention, it is also preferable that the above-described second fusion bonding layer comprises a highly-refractive ultrafine particle or a low-refractive ultrafine particle. This is because, when the thermoplastic resin of the second fusion bonding layer comprises the highly-refractive ultrafine particle or the low-refractive ultrafine particle, the refractive index of the thermoplastic resin can be adjusted.

Furthermore, in the above-described invention, the above-described fusion bonding layer may comprise the above-described light diffusion particle and serve also as the above-described light diffusion layer. When the fusion bonding layer is placed directly on the liquid crystal panel, occurrence of a double image can be decreased by the fusion bonding layer which is serving also as the light diffusion layer. Additionally, the layer structure can be simplified.

In addition, in the above-described invention, it is preferable that, on a plane projected in a normal direction of the viewing-side surface of the above-described liquid crystal panel, sum of an in-plane projected area of the above-described light diffusion particle contained in the above-described light diffusion layer is in a range of 8% to 63% of the total. By employing such a composition, suppression of the uneven display and improvement in the contrast can be balanced.

Further, in the above-described invention, when a regular transmission intensity of the above-described light diffusion layer is denoted by Q and a transmission intensity obtained by extrapolating straight lines that connect the transmission intensities at regular transmission ±2° and regular transmission ±1° to a regular transmission angle is denoted by U, it is preferable that a relationship:

$$2 < Q/U < 22$$

is satisfied. This is because, if Q/U is smaller than the above-described range, there is a fear that vivid complexion and blackness of the display image deteriorate; and, when Q/U is larger than the above-described range, there is a fear that display unevenness occur. Therefore, by adjusting Q/U in the above-described range, suppression of the uneven display and improvement of the vivid complexion and blackness can be balanced.

In addition, the vivid complexion and blackness refers to a performance required of dynamic picture images to have the contrast, three-dimensionality, and liveliness combined (for example, when one considers a scene of a young man under a blue sky, his hair displayed on the screen is black with a smooth and dry feeling; the pupils of his eyes are black with moisture, and his skin has glow characteristic of a young man and looks vivid).

Also, in the above-described invention, when a pixel pitch in a horizontal direction of the above-described liquid crystal panel is denoted by P and a thickness of the above-described light diffusion layer is denoted and T, it is preferable that a relationship:

$$T<P/2$$

is satisfied. This is because, when the thickness of the light diffusion layer satisfies the above-described equation, occurrence of a double image in the usual watching area can be reduced.

Furthermore, in the present invention, when a vertical length and a horizontal length of the above-described liquid crystal panel are denoted by $L_1$ and $W_1$, respectively, and a vertical length and a horizontal length of the above-described transparent substrate are denoted by $L_2$ and $W_2$, respectively, it is preferable that relationships:

$$L_1 \leq L_2 \text{ and/or } W_1 \leq W_2$$

are satisfied. This is because, if these relationships are satisfied, lowering in display image quality can be suppressed, the lowering being due to occurrence of deflection and distortion of the liquid crystal panel caused by imposition of stress thereon.

Also, in the present invention, there may be placed a louver layer on the viewing side of the above-described liquid crystal panel, and the louver layer comprises a strip-shaped transmitting portion and a strip-shaped light-shielding portion which are arranged alternately. This is because the contrast can be improved by the louver layer.

In the above-described invention, it is preferable that the above-described transmitting portion and the above-described light-shielding portion are arranged alternately in a horizontal direction of the above-described liquid crystal panel. When the louver layer does not possess a diffusing function, it is preferable that the transmitting portion and the light-shielding portion are thus arranged alternately in the horizontal direction of the liquid crystal panel. This is because the contrast can be improved by the louver layer without narrowing the angle of view in the horizontal direction of the liquid crystal display device.

Further, in the above-described invention, it is also preferable that the above-described transmitting portion and the above-described light-shielding portion are arranged alternately in a vertical direction of the above-described liquid crystal panel. When the louver layer possesses a light-diffusing function, it is also preferable that the transmitting portion and the light-shielding portion are thus arranged alternately in a vertical direction of the liquid crystal panel. This is because the angle of view in the horizontal direction of the liquid crystal display device can be made wider while improving the contrast.

In the above-described case, it is preferable that the maximum angle at which light can exit the above-described transmitting portion of the above-described louver layer is 45° or more relative to the normal direction of the viewing-side surface of the louver layer. This is because the external light can be absorbed and a usual watching area in the vertical direction of the liquid crystal display device can be secured.

Also, in the above-described case, the above-described louver layer is preferably placed on the viewing side of the above-described light diffusion layer. This is because the contrast can be improved by reduction of external light incident on the light diffusion layer and absorption of external light reflected by the light diffusion layer. Further, this is because, in order to suppress occurrence of the double image, it is preferable that the light diffusion layer is placed in the vicinity of the liquid crystal panel.

Furthermore, in the above-described case, it is preferable that the second fusion bonding layer comprising the thermoplastic resin and the above-described louver layer are placed sequentially between the above-described liquid crystal panel and the above-described fusion bonding layer. This is because the liquid crystal panel, the louver layer, and the transparent substrate can be bonded with good adhesion by the fusion bonding layer and the second fusion bonding layer.

Also, in the present invention, there may be placed a light-absorbing layer on the viewing side of the above-described liquid crystal panel, and the light-absorbing layer has an average light absorptance in a range of 1% to 30% in a wavelength range of 400 nm to 750 nm. This is because the contrast can be improved by the light-absorbing layer.

In the above-described invention, the above-described light-absorbing layer preferably has a selective absorption property of absorbing a wavelength other than the predefined wavelength of an image light itself. This is because the contrast can be improved further as follows: in comparison to the external light which contains a full range of wavelengths, the image light has specified wavelengths (for example, it is general to use red, green, and blue which are the three primary colors of light) and, therefore, when the light-absorbing layer has a selective absorption property, attenuation of the image light by the light-absorbing layer is suppressed and absorption of the external light can be increased.

In addition, when the above-described light-absorbing layer has a selective absorption property, the liquid crystal display device of the present invention preferably employs LED light sources each having a different wavelength as a backlight and, more preferably, is a liquid crystal display device based on a field sequential method which drives the liquid crystal display device in synchronism with an emission wavelength of the above-described LED light source. This is because the LED light source having a single wavelength can broaden the range of wavelengths absorbed selectively by the light-absorbing layer and because, when a field sequential method using an LED light source is employed without using a color filter, the image light itself comes to possess predefined wavelength and, therefore, the range of wavelengths absorbed selectively by the light-absorbing layer can be further broadened. Hereby, the contrast can be further improved.

In the above-described invention, the above-described light-absorbing layer is preferably placed on the viewing side of the above-described light diffusion layer. This is because, in order to suppress occurrence of the double image, the light diffusion layer is preferably placed in the proximity of the liquid crystal panel. In addition, by employing such a configuration, the light-absorbing layer exhibits effects in both absorption of the external light incident on the light diffusion layer and absorption of the external light reflected by the light diffusion layer, which are preferable for improvement of the contrast. Further, this is because the image becomes clear and the contrast is enhanced because the stray light, which is generated when the image light entering the light-absorbing layer from the liquid crystal panel passes through the light diffusion layer, passes through the light-absorbing layer at an angle and, therefore, is absorbed more than the image light, resulting in reduction of flare (some light of a portion displaying white becomes stray light and exits from the portion displaying black).

Also, in the above-described invention, the above-described fusion bonding layer preferably serves also as the above-described light-absorbing layer. This is because, as mentioned above, the contrast can be improved.

Further, in the above-described invention, it is preferable that the second fusion bonding layer comprising the thermoplastic resin and the above-described light-absorbing layer are placed sequentially between the above-described liquid crystal panel and the above-described fusion bonding layer. This is because the liquid crystal panel, the light-absorbing layer, and the transparent substrate can be bonded with good adhesion by the fusion bonding layer and the second fusion bonding layer.

Furthermore, in the present invention, the above-described second fusion bonding layer preferably comprises the above-described light diffusion particle and serves also as the above-described light diffusion layer. This is because occurrence of the double image can be suppressed by placing the second fusion bonding layer which serves also as the light diffusion layer in the proximity of the liquid crystal panel.

In the above-described invention, the above-described second fusion bonding layer preferably comprises a cross-linking agent. This is because heat resistance of the second fusion bonding layer after fusion bonding by heating can be improved.

Also, in the above-described invention, it is preferable to use, as the above-described second fusion bonding layer, a sheet-like or film-like second fusion bonding layer having a concave-convex shape on a surface. If there is a concave-convex shape on a surface of the sheet-like or film-like second fusion bonding layer, air bubbles entrained during bonding of the liquid crystal panel and the transparent substrate can be released.

EFFECT OF THE INVENTION

In the present invention, the transparent substrate having rigidity is bonded to the viewing-side surface of the liquid crystal panel with the fusion bonding layer being interposed therebetween. Thus, there are exhibited effects that the impact resistance is improved and reliability is enhanced and that it is possible to prevent lowering in the display quality, the lowering being due to bonding of the liquid crystal panel and the transparent substrate with the fusion bonding layer interposed therebetween. Furthermore, in the present invention, by placing functional layers such as the light diffusion layer, the louver layer, and the light-absorbing layer, effects are exhibited that display defects such as unevenness are decreased and that improvement of the contrast and the like become possible, thus enabling improvement in the display quality.

DESCRIPTION OF THE PREFERRED EMBODIMENTS

Hereinafter, the liquid crystal display device of the present invention will be described in detail.

The liquid crystal display device of the present invention comprises a liquid crystal panel, a transparent substrate having rigidity, and a fusion bonding layer comprising a thermoplastic resin, characterized in that the transparent substrate is bonded to a viewing-side surface of the liquid crystal panel with the fusion bonding layer interposed therebetween.

The liquid crystal display device of the present invention will be described with reference to drawings.

Figure 1:
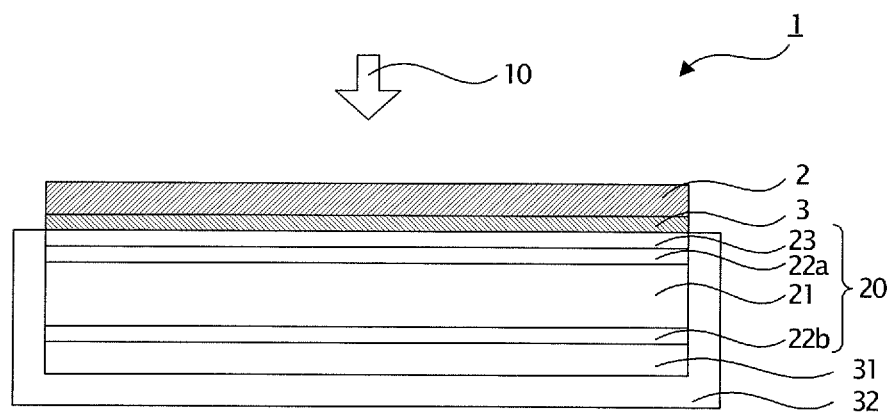
FIG. 1 is a schematic cross-sectional view showing an example of the liquid crystal display device of the present invention.

FIG. 1 is a schematic cross-sectional view showing an example of the liquid crystal display device of the present invention. The liquid crystal display device 1 exemplified in FIG. 1 comprises a liquid crystal panel 20, a backlight unit 31 placed on the backside of the liquid crystal panel 20, and a housing 32 which protects the liquid crystal panel 20 and the backlight unit 31. In the liquid crystal display device 1, a transparent substrate having rigidity 2 is bonded to the surface of the viewing side 10 of the liquid crystal panel 20 with a fusion bonding layer 3 interposed therebetween, the fusion bonding layer comprising a thermoplastic resin. The liquid crystal panel 20 comprises a liquid crystal cell 21, a viewing-side polarizer 22a placed on the viewing side 10 of the liquid crystal cell 21, a backside polarizer 22b placed on the backside of the liquid crystal cell 21, and a functional film 23, such as an anti-glare film and an anti-reflection film, which are placed on the viewing side 10 of the viewing-side polarizer 22a. The liquid crystal cell 21 comprises, though not shown in the drawing, a pair of supporting plates, liquid crystals sandwiched between the supporting plates, an alignment film which aligns liquid crystal molecules, an electrode which regulates alignment of the liquid crystal molecules by an electric field, and a color filter.

According to the present invention, a transparent substrate having rigidity is bonded to the viewing-side surface of a liquid crystal panel with a fusion bonding layer interposed therebetween. Thus, it is possible to improve impact resistance of the liquid crystal display device and to enhance reliability of the product when conveying, transporting or storing, and further when using. Additionally, according to the present invention, because the fusion bonding layer comprises a thermoplastic resin, the liquid crystal display device can be fabricated by molding the thermoplastic resin into a sheet or film; sequentially laminating the liquid crystal panel, the sheet-like or film-like fusion bonding layer, and a transparent substrate; and, using a lamination method to bond these under pressure and heat. Thus, it is possible to obtain a liquid crystal display device having excellent impact resistance by an easy method without causing lowering in the display quality.

Figure 2:
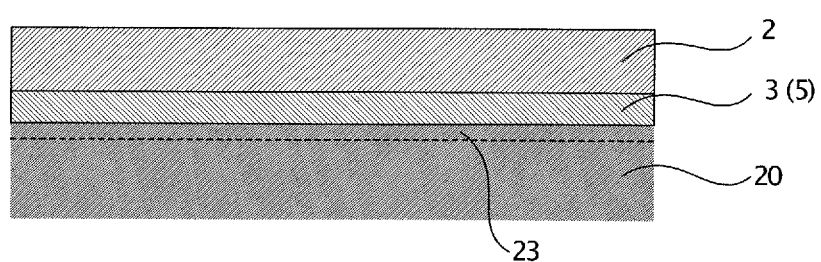
FIG. 2 is a schematic cross-sectional view showing another example of the liquid crystal display device of the present invention.
Figure 3:
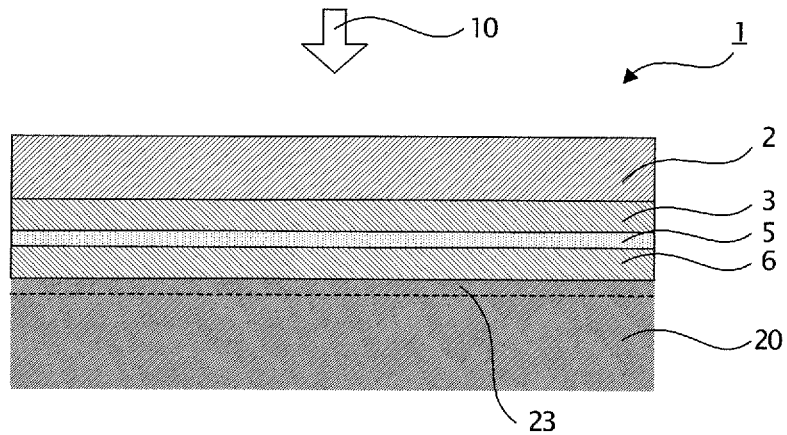
FIG. 3 is a schematic cross-sectional view showing another example of the liquid crystal display device of the present invention.
Figure 4:
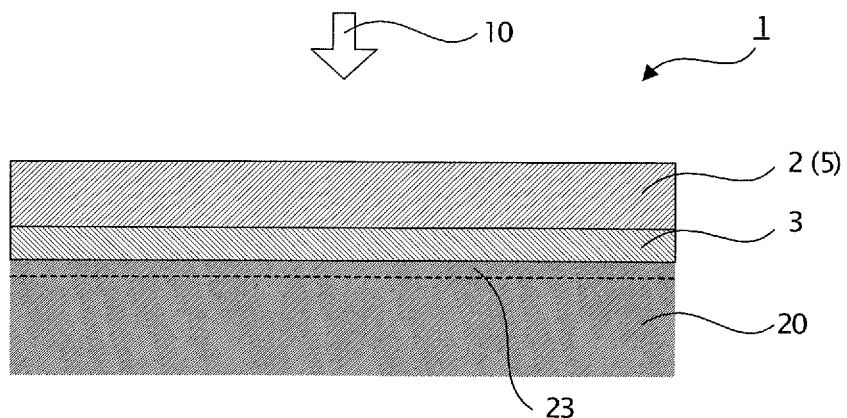
FIG. 4 is a schematic cross-sectional view showing another example of the liquid crystal display device of the present invention.

FIG. 2 to FIG. 4 are each a schematic cross-sectional view showing another example of the liquid crystal display device of the present invention.

In the liquid crystal display device 1 exemplified in FIG. 2, the transparent substrate 2 having rigidity is bonded to the surface of the viewing side 10 of the liquid crystal panel 20 with the fusion bonding layer 3 interposed therebetween. The fusion bonding layer 3 comprises light diffusion particles dispersed in a thermoplastic resin and serves also as the light diffusion layer 5.

In the liquid crystal display device 1 exemplified in FIG. 3, there are laminated sequentially the second fusion bonding layer 6 comprising a thermoplastic resin, the light diffusion layer 5 comprising light diffusion particles dispersed in a thermoplastic resin, the fusion bonding layer 3 comprising a thermoplastic resin, and a transparent substrate 2 having rigidity on a surface of the viewing side 10 of the liquid crystal panel 20.

In the liquid crystal display device 1 exemplified in FIG. 4, the transparent substrate 2 having rigidity is bonded to the surface of the viewing side 10 of the liquid crystal panel 20 with the fusion bonding layer 3 interposed therebetween, the fusion bonding layer comprising a thermoplastic resin. The transparent substrate 2 comprises the light diffusion particles and serves also as the light diffusion layer 5.

As described above, in the present invention, the light diffusion layer is preferably placed on the viewing side of the liquid crystal panel. For example, in each of the liquid crystal display device 1 shown in FIG. 2 to FIG. 4, when the functional film 23, which constitutes the surface of the viewing side 10 of the liquid crystal panel 20, possesses a concave-convex shape on a surface of the viewing side 10, if the transparent substrate 2 is bonded to the surface of the viewing side 10 of the functional film 23 with the fusion bonding layer 3, or the fusion bonding layer 3 and the second fusion bonding layer 6 interposed therebetween, the concave-convex shape of the functional film 23 is filled up with the fusion bonding layer 3 or the second fusion bonding layer 6. Generally, because the refractive index ratio of the material which constitutes the functional film and the thermoplastic resin which constitutes the fusion bonding layer or the second fusion bonding layer is smaller than the refractive index ratio of the material which constitutes the functional film and air, there is a fear that the light-diffusing property due to the concave-convex shape of the functional film is damaged by the fusion bonding layer or the second fusion bonding layer. If the light-diffusing property is damaged, the display defects such as uneven color and non-uniform brightness due to the liquid crystal panel and the backlight unit become easily visually recognizable. For example, according to the technique described in the above-described Patent Document 1, an adhesive layer having a refractive index similar to those of the polarizer of the liquid crystal panel and the toughened substrate is used, light diffusion at the concave-convex surface present on a surface of the liquid crystal panel disappears and, therefore, a problem arises that defects such as unevenness due to the liquid crystal display device itself become more visible and the yield is lowered.

In contrast, in the present invention, the display defects can be made less visually recognizable by the light diffusion layer being placed on the viewing side of the liquid crystal panel. That is, by imparting an internal diffusion function, it becomes possible to reduce the display defects such as unevenness which appear superposed on the image light.

Figure 5:
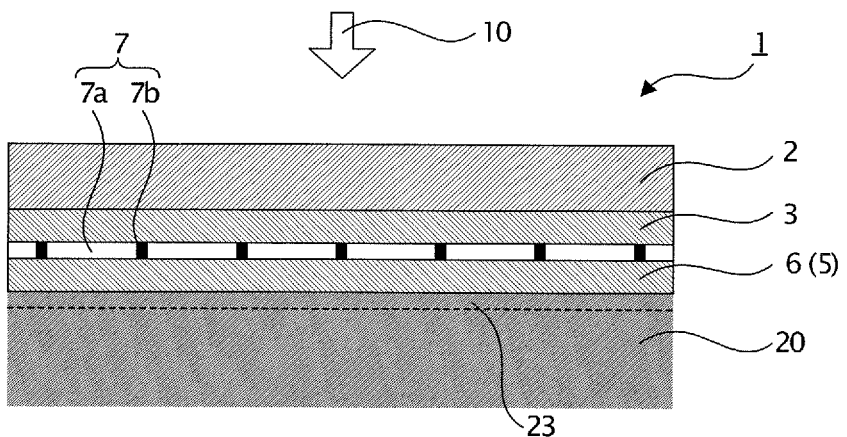
FIG. 5 is a schematic cross-sectional view showing another example of the liquid crystal display device of the present invention.
Figure 6:
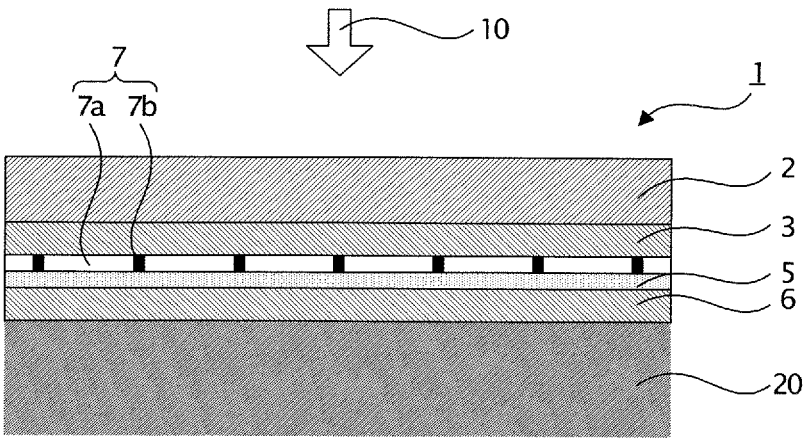
FIG. 6 is a schematic cross-sectional view showing another example of the liquid crystal display device of the present invention.

FIG. 5 and FIG. 6 are each a schematic cross-sectional view showing another example of the liquid crystal display device of the present invention.

In the liquid crystal display device 1 exemplified in FIG. 5, on a surface of the viewing side 10 of the liquid crystal panel 20, there are laminated sequentially the second fusion bonding layer 6, a louver layer 7 comprising strip-shaped transmitting portions 7a and strip-shaped light-shielding portions 7b which are arranged alternately, the fusion bonding layer 3, and the transparent substrate 2. The second fusion bonding layer 6 is a thermoplastic resin in which the light diffusion particles are dispersed and serves also as the light diffusion layer 5.

In the liquid crystal display device 1 exemplified in FIG. 6, on a surface of the viewing side 10 of the liquid crystal panel 20, there are laminated sequentially the second fusion bonding layer 6, the light diffusion layer 5, the louver layer 7 comprising strip-shaped transmitting portions 7a and strip-shaped light-shielding portions 7b which are arranged alternately, the fusion bonding layer 3, and the transparent substrate 2.

As described above, in the present invention, the louver layer may be placed on the viewing side of the liquid crystal panel. When the louver layer is placed on the viewing side of the liquid crystal panel, external light incident at an angle is shielded by the light-shielding portions of the louver layer and the amount of external light reflected at the display surface decreases, thus resulting in improvement of the contrast in the front direction. That is, by imparting a function of absorbing external light, improvement of the contrast becomes possible.

Figure 7:
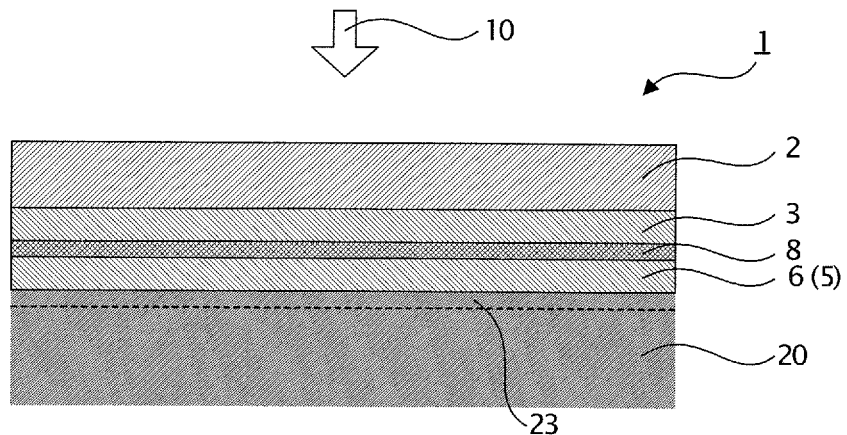
FIG. 7 is a schematic cross-sectional view showing another example of the liquid crystal display device of the present invention.
Figure 8:
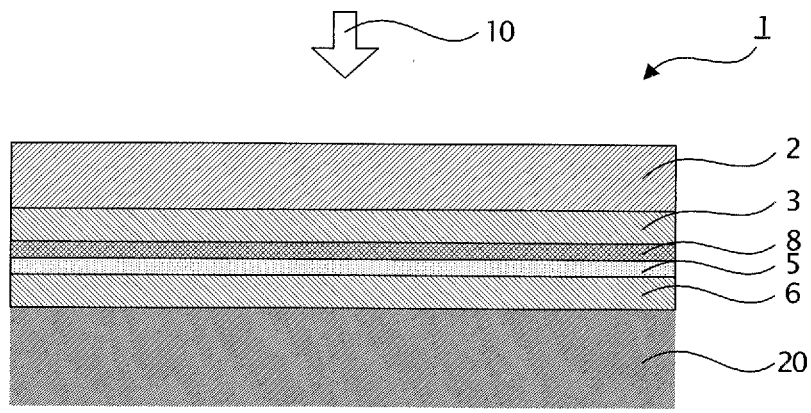
FIG. 8 is a schematic cross-sectional view showing another example of the liquid crystal display device of the present invention.

FIG. 7 and FIG. 8 are each a schematic cross-sectional view showing another example of the liquid crystal display device of the present invention.

In the liquid crystal display device 1 exemplified in FIG. 7, on a surface of the viewing side 10 of the liquid crystal panel 20, there are laminated sequentially the second fusion bonding layer 6, the light absorbing-layer 8, the fusion bonding layer 3, and the transparent substrate 2. The second fusion bonding layer 6 is a thermoplastic resin in which the light diffusion particles are dispersed and serves also as the light diffusion layer 5.

In the liquid crystal display device 1 exemplified in FIG. 8, on a surface of the viewing side 10 of the liquid crystal panel 20, there are laminated sequentially the second fusion bonding layer 6, the light diffusion layer 5, the light-absorbing layer 8, the fusion bonding layer 3, and the transparent substrate 2.

In FIG. 7 and FIG. 8, the light-absorbing layer 8 has an average light absorptance in a range of 1% to 30% in a wavelength range of 400 nm to 750 nm.

As described above, in the present invention, the light-absorbing layer may be placed on the viewing side of the liquid crystal panel. When the light-absorbing layer is placed on the viewing side of the liquid crystal panel, the contrast and the sharpness of the image can be improved. That is, by imparting a function of absorbing external light, improvement of the contrast becomes possible.

Hereinafter, each component of the liquid crystal display device of the present invention will be described.

1. Transparent Substrate

The transparent substrate in the present invention has rigidity and is bonded to the viewing-side surface of the liquid crystal panel with a fusion bonding layer interposed therebetween.

The transparent substrate is not particularly limited as long as it has rigidity. For example, a glass substrate or a resin substrate may be used.

The material for the resin substrate is not particularly limited as long as it provides a resin substrate having rigidity. For example, there may be mentioned a polycarbonate resin, an acrylic resin, an organic glass-type resin, and an acryl-styrene resin.

Above all, the transparent substrate is preferably a glass substrate. It can further enhance resistance to deflection as well as impact resistance. In addition, in the conventional liquid crystal display device, the display surface of the liquid crystal panel comprises a thin functional film in an exposed state and is especially easy to be scratched. However, by employing a glass substrate as the transparent substrate, scratch resistance can be enhanced. Further, because the glass substrate absorbs ultraviolet light, deterioration of the components of the liquid crystal display device due to ultraviolet light can be suppressed. Furthermore, compared to the resin substrates, the glass substrate has better resistance to water and chemicals and also has an advantage of being inexpensive.

A thickness of the transparent substrate is not particularly limited as long as the thickness is such that desired rigidity can be obtained. For example, the thickness in a range of about 0.5 mm to 4 mm is sufficient. Above all, the thickness is preferably in a range of 0.7 mm to 3.5 mm, and especially preferably in a range of 1 mm to 3 mm. This is because, if the thickness of the transparent substrate is thin, there are cases where desired rigidity and strength cannot be obtained and, if the thickness of the transparent substrate is thick, weight saving and thickness reduction of the liquid crystal display device become difficult to realize.

With regard to the size of the transparent substrate, when the vertical and horizontal length of the liquid crystal panel are denoted by $L_1$ and $W_l$, respectively, and the vertical and horizontal length of the transparent substrate are denoted by $L_2$ and $W_2$, respectively, it is preferable that relationships:

$$L_1 \leq L_2 \text{ and/or } W_l \leq W_2$$

are satisfied. This is because, if the transparent substrate is smaller than the liquid crystal panel, stress may be exerted on the liquid crystal panel to produce deflection and strain, causing a fear of deterioration in the display properties. It is sufficient if, with regard to at least either of the vertical and horizontal length, the transparent substrate is equal to or longer than the liquid crystal panel. Above all, it is more preferable that, with regard to whichever is longer of the vertical and horizontal length, the transparent substrate is equal to or longer than the liquid crystal panel. For example, if the horizontal length is longer than the vertical length, it is preferable that $W \leq W_2$. Especially, it is preferable that, with regard to both of the vertical and horizontal length, the transparent substrate is equal to or longer than the liquid crystal panel. That is, it is preferable that $L_1 \leq L_2$ and $W_l \leq W_2$.

The transparent substrate may serve also as the light diffusion layer which will be described later. As exemplified in FIG. 4, the transparent substrate 2 serving also as the light diffusion layer 5 can make the display defects due to the liquid crystal panel and the backlight unit less visually recognizable. When the transparent substrate serves also as the light diffusion layer, the transparent substrate may comprise the light diffusion particles and may also comprise the concave-convex shape on a surface of the viewing side and/or the liquid crystal panel side.

As examples of the transparent substrate having the concave-convex shape on a surface, there may be used, frosted glass, and a glass substrate on which a concave-convex shape comprising a resin is formed. As examples of a method for preparing the frosted glass, there may be applied, sandblasting, frosting, and embossing. In addition, as examples of a method for preparing the concave-convex shape comprising a resin on the glass substrate, there may be applied a method of coating a concave-convex shape-forming resin, and a method to bond a film having a concave-convex shape on a surface.

It is noted that description of the case where the transparent substrate serves also as the light diffusion layer will be omitted here, because the light diffusion layer will be described later.

The transparent substrate may comprise strip-shaped transmitting portions strip-shaped light-shielding portions arranged alternately. That is, the transparent substrate may serve also as a louver layer which will be described later.

It is noted that description of the case where the transparent substrate serves also as the louver layer will be omitted here, because the louver layer will be described later.

The transparent substrate may have an average light absorptance in a range of 1% to 30% in a wavelength range of 400 nm to 750 nm. That is, the transparent substrate may serve also as the light-absorbing layer which will be described later.

It is noted that description of the case where the transparent substrate serves also as the light-absorbing layer will be omitted here, because the light-absorbing layer will be described later.

2. Fusion Bonding Layer

The fusion bonding layer in the present invention comprises a thermoplastic resin and bonds the liquid crystal panel and the transparent substrate.

The thermoplastic resin contained in the fusion bonding layer is not particularly limited as long as it is a resin which melts at a desired temperature. Above all, the melting temperature of the thermoplastic resin is preferably in a range of 50° C. to 130° C., more preferably in a range of 60° C. to 120° C., and even more preferably in a range of 60° C. to 100° C. If the melting temperature exceeds the above-described range, there is a possibility that the polarizer of the liquid crystal panel deteriorates when fusion-bonded by heating; and, when the melting temperature is lower than the above-described range, there is a fear that the fusion bonding layer may soften depending on the environment when the completed liquid crystal display device is put to use.

As examples of such thermoplastic resins, there may be mentioned, polyethylene, polypropylene, polyisobutylene, polystyrene, polyolefins such as an ethylene-propylene rubber, an ethylene-vinyl acetate copolymer, an ethylene-acrylic acid copolymer, ethyl cellulose, cellulose derivatives such as cellulose triacetate, a copolymer of poly(meth)acrylic acid and its ester, polyvinyl acetate, polyvinyl alcohol, polyvinyl acetals such as polyvinyl butyral, polyacetal, polyamide, polyimide, nylon, a polyester resin, a urethane resin, an epoxy resin, a silicone resin, and a fluoro resin. Above all, from a viewpoint of adhesion property and optical transparency, preferable are polyvinyl acetals, polyolefins, an ethylene-vinyl acetate copolymer, a urethane resin, an epoxy resin, a silane-modified resin, and an acid-modified resin. Especially suitable are polyvinyl butyral and an ethylene-vinyl acetate copolymer. This is because the ethylene-vinyl acetate copolymer has an excellent adhesion property and the polyvinyl butyral has excellent transparency.

Above all, when the fusion bonding layer is in contact with the transparent substrate, the thermoplastic resin is preferably one whose refractive index ratio relative to the material which constitutes the transparent substrate is small. Similarly, when the fusion bonding layer is in contact with the liquid crystal panel, the thermoplastic resin is preferably one whose refractive index ratio relative to the material which constitutes the outermost member (for example, a functional film) of the liquid crystal panel is small. This is because reflection at the interface of either the transparent substrate or the liquid crystal panel is decreased, occurrence of the stray light is suppressed, and lowering of the resolution and the contrast can be prevented.

The fusion bonding layer may comprise an additive such as a light stabilizer, an ultraviolet absorber, a thermal stabilizer, an antioxidant. This is because inclusion of these additives makes it possible to obtain mechanical strength which remains stable for a long time, yellowing prevention, crack prevention, and good processing suitability.

The fusion bonding layer may further comprise a cross-linking agent, a dispersant, a leveling agent, a plasticizer, an antifoaming agent, and the like. When the fusion bonding layer comprises the cross-linking agent, heat resistance after fusion bonding by heating can be improved. As the cross-linking agent, for example, there may be used a silane coupling agent.

Further, the fusion bonding layer may comprise the light diffusion particles. That is, the fusion bonding layer may be a thermoplastic resin in which the light diffusion particles are dispersed. In this case, the fusion bonding layer may serve also as the light diffusion layer which will be described later. As exemplified in FIG. 2, the fusion bonding layer 3 serving also as the light diffusion layer 5 can make the display defects due to the liquid crystal panel and the backlight unit less visually recognizable. When the fusion bonding layer is placed directly on the liquid crystal panel, the fusion bonding layer preferably comprises the light diffusion particles and serves also as the light diffusion layer.

It is noted that description of the case where the fusion bonding layer serves also as the light diffusion layer will be omitted here, because the light diffusion layer will be described later.

The fusion bonding layer may comprise strip-shaped transmitting portions and strip-shaped light-shielding portions arranged alternately. That is, the fusion bonding layer may also serve as the louver layer which will be described later.

It is noted that description of the case where the fusion bonding layer serves also as the louver layer will be omitted here, because the louver layer will be described later.

The fusion bonding layer may have an average light absorptance in a range of 1% to 30% in a wavelength range of 400 nm to 750 nm. That is, the fusion bonding layer may also serve as the light-absorbing layer which will be described later.

It is noted that description of the case where the fusion bonding layer serves also as the light-absorbing layer will be omitted here, because the light-absorbing layer will be described later.

The thickness of the fusion bonding layer is not particularly limited as long as desired adhesion is manifested and is suitably adjusted depending on the kind of the above-described thermoplastic resin. Specifically, the thickness of the fusion bonding layer is preferably in a range of 0.05 mm to 0.5 mm, more preferably in a range of 0.05 mm to 0.3 mm, and even more preferably in a range of 0.1 mm to 0.3 mm. This is because, when the thickness of the fusion bonding layer is thinner, there are cases where desired adhesion cannot be obtained and, when the thickness of the fusion bonding layer is thicker, excessive heating becomes necessary in order for interlayer bonding strength by the fusion bonding layer to be fully exhibited, which sometimes causes significant thermal damage to the liquid crystal panel and the transparent substrate.

As examples of a method for bonding the liquid crystal panel and the transparent substrate with the fusion bonding layer interposed therebetween, there may be mentioned, a method where a thermoplastic resin is molded in a sheet or a film, and the liquid crystal panel and the transparent substrate are laminated with a sheet-like or film-like fusion bonding layer interposed therebetween.

The method for molding the thermoplastic resin in a sheet or a film is not particularly limited as long as a sheet-like or film-like fusion bonding layer of uniform thickness can be prepared. There may be employed a common film-forming method for a resin sheet or a resin film, for example, a solution film-forming method and a melt film-forming method.

Furthermore, it is preferable that the sheet-like or film-like fusion bonding layer before bonding possesses a concave-convex shape on a surface. That is, as the fusion bonding layer, it is preferable to use sheet-like or film-like fusion bonding layer having a concave-convex shape on a surface. If there is a concave-convex shape on a surface of the sheet-like or film-like fusion bonding layer, the air bubbles entrained during bonding of the liquid crystal panel and the transparent substrate can be released.

The concave-convex shape is not particularly limited as long as the air bubbles entrained during bonding of the liquid crystal panel and the transparent substrate can be released. However, the 10-point average roughness $R_z$ thereof is preferably 0.2 μm or more. This is because, if the 10-point average roughness $R_z$ is in the above-described range, removal of the air bubbles entrained during bonding of the liquid crystal panel and the transparent substrate can be performed easily. In addition, the cut-off value is preferably 0.8 mm.

3. The Second Fusion Bonding Layer

In the present invention, when functional layers such as the light diffusion layer, the louver layer, and light-absorbing layer, which will be described later, are placed on the viewing side of the liquid crystal panel, there may be placed the second fusion bonding layer comprising a thermoplastic resin and the above-described functional layer sequentially between the liquid crystal panel and the fusion bonding layer.

For example, as shown in FIG. 3, when the light diffusion layer 5 is placed on the viewing side 10 of the liquid crystal panel 20, the second fusion bonding layer 6, the light diffusion layer 5, the fusion bonding layer 3, and the transparent substrate 2 may be laminated sequentially on the viewing side 10 of the liquid crystal panel 20, wherein the liquid crystal panel 20 and the light diffusion layer 5 are bonded with the second fusion bonding layer 6 interposed therebetween, and the light diffusion layer 5 and the transparent substrate 2 are bonded with the fusion bonding layer 3 interposed therebetween.

Further, as shown in FIG. 5, when the louver layer 7 is placed on the viewing side 10 of the liquid crystal panel 20, the second fusion bonding layer 6, the louver layer 7, the fusion bonding layer 3, and the transparent substrate 2 may be laminated sequentially on the viewing side 10 of the liquid crystal panel 20, wherein the liquid crystal panel 20 and the louver layer 7 are bonded with the second fusion bonding layer 6 interposed therebetween, and the louver layer 7 and the transparent substrate 2 are bonded with the fusion bonding layer 3 interposed therebetween.

As shown in FIG. 7, when the light-absorbing layer 8 is placed on the viewing side 10 of the liquid crystal panel 20, the second fusion bonding layer 6, the light-absorbing layer 8, the fusion bonding layer 3, and the transparent substrate 2 may be laminated sequentially on the viewing side 10 of the liquid crystal panel 20, wherein the liquid crystal panel 20 and the light-absorbing layer 8 are bonded with the second fusion bonding layer 6 interposed therebetween and the light-absorbing layer 8 and the transparent substrate 2 are bonded with the fusion bonding layer 3 interposed therebetween.

The thermoplastic resin which constitutes the fusion bonding layer and the second fusion bonding layer can be molded in a sheet or a film. And, by using a sheet-like or film-like fusion bonding layer and second fusion bonding layer, it becomes possible to bond the liquid crystal panel, the above-described functional layers, and the transparent substrate by a simple method without lowering the display quality.

As the thermoplastic resin contained in the second fusion bonding layer, there may be used the same thermoplastic resins as those contained in the above-described fusion bonding layer.

Above all, as exemplified in FIG. 3, FIG. 6, and FIG. 8, when the second fusion bonding layer 6 is in contact with the light diffusion layer 5 and when, at the same time, the light diffusion layer 5 has concavities and convexities on a surface facing the second fusion bonding layer 6, the refractive index of the thermoplastic resin contained in the second fusion bonding layer is preferably different from the refractive index of the material constituting the light diffusion layer and, more preferably, the refractive index ratio of the thermoplastic resin contained in the second fusion bonding layer and the material constituting the light diffusion layer is large. This is because, the larger the refractive index ratio of the thermoplastic resin contained in the second fusion bonding layer and the material constituting the light diffusion layer, the further the light diffusion property due to the concave-convex surface of the light diffusion layer can be enhanced.

It is noted that description of the above-described refractive index ratio will be omitted here, because it will be described later in the section of the light diffusion layer.

Furthermore, when the second fusion bonding layer is in contact with the light diffusion layer and when, at the same time, the light diffusion layer has concavities and convexities on a surface on the side of the second fusion bonding layer, the thermoplastic resin may also preferably comprise, for the purpose of adjusting the refractive index thereof, highly-refractive-index ultrafine particles or low-refractive-index ultrafine particles having an average particle size in a range of 1 nm to 300 nm. By adjusting the refractive index of the thermoplastic resin, the refractive index ratio of the thermoplastic resin contained in the second fusion bonding layer and the material constituting the light diffusion layer can be increased and, thereby, the concavities and convexities on a surface of the light diffusion layer can diffuse light more effectively.

It is noted that description of the above-described highly-refractive-index ultrafine particles and low-refractive-index ultrafine particles will be omitted here, because they will be described later in the section of the light diffusion layer.

Further, when the second fusion bonding layer is in contact with the liquid crystal panel, the thermoplastic resin is preferably one having a small refractive index ratio relative to the material which constitutes the outermost member (for example, a functional film) of the liquid crystal panel.

The second fusion bonding layer may comprise the light diffusion particles. That is, the second fusion bonding layer may be a thermoplastic resin in which the light diffusion particles are dispersed. In this case, the second fusion bonding layer can also serve as the light diffusion layer which will be described later. As exemplified in FIG. 5 and FIG. 7, by having the second fusion bonding layer 6 serving also as the light diffusion layer 5, the image defects due to the liquid crystal panel and the backlight unit can be made less visually recognizable. When the second fusion bonding layer is placed directly on the liquid crystal panel, the second fusion bonding layer preferably comprises the light diffusion particles and serves also as the light diffusion layer.

It is noted that description of the case where the second fusion bonding layer serves also as the light diffusion layer will be omitted here, because the light diffusion layer will be described later.

The placement of the second fusion bonding layer is between the liquid crystal panel and the fusion bonding layer, usually directly on the liquid crystal panel. Between the second fusion bonding layer and the fusion bonding layer, there are placed the functional layers such as the light diffusion layer, the louver layer, and the light-absorbing layer.

The thickness of the second fusion bonding layer can be the same as the thickness of the above-described fusion bonding layer.

Above all, as exemplified in FIG. 3, FIG. 6, and FIG. 8, when the second fusion bonding layer 6 is in contact with the light diffusion layer 5 and when, at the same time, the light diffusion layer 5 comprises the light diffusion particles and has concavities and convexities due to these light diffusion particles on a surface, the thickness of the second fusion bonding layer is preferably larger than that of the concavities and convexities formed by the light diffusion particles on a surface of the light diffusing layer in order to prevent deterioration in diffusion due to the concavities and convexities on a surface of the light diffusion layer.

It is noted that description of the method of forming the second fusion bonding layer and the rest will be omitted here, because they are the same as in the above-described fusion bonding layer.

4. Light Diffusion Layer

In the present invention, the light diffusion layer is preferably placed on the viewing side of the liquid crystal panel. Even though there are some cases where bonding of the transparent substrate to the liquid crystal panel with the fusion bonding layer interposed therebetween causes display defects, such as uneven color and non-uniform brightness, due to the liquid crystal panel and a backlight to be more visually recognizable, the placement of the light diffusion layer on the viewing side of the liquid crystal panel can make the display defects less visually recognizable.

Figure 9:
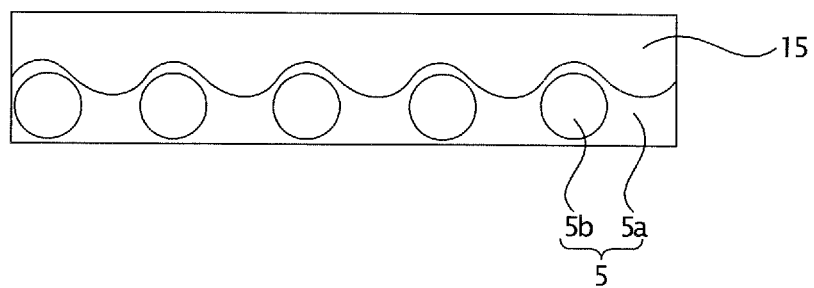
FIG. 9 is a schematic cross-sectional view for illustrating the light diffusion layer of the present invention.

As the light diffusion layer, there may be used one having the light diffusion particles dispersed in a binder (hereinafter, referred to as particle diffusion) and one having concavities and convexities on the layer surface (hereinafter, referred to as interfacial diffusion). Above all, the light diffusion layer preferably has an internal diffusion function due to the particle diffusion and/or the interfacial diffusion; and more preferably has an internal diffusion function due to both of the particle diffusion and the interfacial diffusion. The light diffusion layer having an internal diffusion function due to both of the particle diffusion and the interfacial diffusion corresponds to the light diffusion layer 5 as exemplified in FIG. 9, the light diffusion layer having the light diffusion particles 5b dispersed in the binder 5a and having concavities and convexities on a surface. Meanwhile, in FIG. 9, a layer 15 represents any layer which is in contact with the light diffusion layer 5.

The particle diffusion exhibits an effect for preventing glare (scintillation). However, if a light diffusion property sufficient to prevent the display defects is depend only on the particle diffusion and the refractive index ratio of the binder and the light diffusion particles is made larger, lowering of the contrast due to whitening may sometimes be occurred.

On the other hand, in the interfacial diffusion, as an angle of inclination of the concavities and convexities can be made smaller compared to the particles (the particles have angles of inclination ranging from 0° to 90°), whitening does not become a big issue even if the refractive index ratio (the refractive index ratio of the light diffusion layer and a layer which is in contact with the light diffusion layer) at the concave-convex interface is large. However, with only the interfacial diffusion, there is a fear of occurrence of glare (scintillation).

Accordingly, by separating both functions of particle diffusion and interfacial diffusion and by preventing the display defects with the interfacial diffusion and preventing the glare with the particle diffusion, good image quality can be recognized.

In the case of the particle diffusion, the refractive index ratio of the light diffusion particles and the binder is not particularly limited as long as the refractive indices of the light diffusion particles and the binder are different. Above all, as mentioned above, the particles have angles of inclination ranging from 0° to 90° and, therefore, if the refractive index ratio of the light diffusion particles and the binder is large, lowering of the contrast sometimes occurs due to whitening. Therefore, even though the difference in refractive indices of the light diffusion particles and the binder is not zero, the refractive index ratio of the light diffusion particles and the binder is preferably as small as possible. Especially, when the light diffusion layer has the internal diffusion function due to both of the particle diffusion and the interfacial diffusion, the refractive index ratio of the light diffusion layer and the binder, by being as small as possible, can decrease lowering of the contrast while preventing the glare. Specifically, of the light diffusion particles and the binder, the ratio of the higher refractive index to the smaller refractive index is preferably more than 1.000 and less than 1.020, more preferably more than 1.000 and less than 1.010, and even more preferably more than 1.000 and less than 1.005.

In addition, for each of the refractive indices of the light diffusion particles and the binder, reference shall be made to a literature data of the material to be used.

The respective refractive indices of the light diffusion particles and the binder are not particularly limited as long as they satisfy the above-mentioned refractive index ratio. The refractive index of the light diffusion particles may be higher or may be lower than the refractive index of the binder.

On the other hand, in the case of the interfacial diffusion, the refractive index ratio of the material which constitutes the light diffusion layer and the material which constitutes the layer being in contact with the light diffusion layer is not particularly limited as long as the refractive indices of the material which constitutes the light diffusion layer and the material which constitutes the layer being in contact with the light diffusion layer are different. Above all, it is preferable that the refractive index ratio of the material constituting the light diffusion layer and the material constituting the layer being in contact with the light diffusion layer is large. This is because, the larger the refractive index ratio of the material which constitutes the light diffusion layer and the material which constitutes the layer being in contact with the light diffusion layer is, the more the light diffusing property due to the concavities and convexities on a surface of the light diffusion layer can be improved. Especially, when the light diffusion layer has the internal diffusion function due to both of the particle diffusion and the interfacial diffusion, visual recognition of the display defects can be prevented by increasing the refractive index ratio of the material which constitutes the light diffusion layer and the material which constitutes the layer being in contact with the light diffusion layer. Specifically, among the material which constitutes the light diffusion layer and the material which constitutes the layer being in contact with the light diffusion layer, the ratio of the larger refractive index to the smaller refractive index is preferably in a range of 1.010 or more and less than 1.300, more preferably in a range of 1.020 or more and less than 1.250, and even more preferably in a range of 1.030 or more and less than 1.200. This is because, if the refractive index ratio is less than the above-described range, diffusion due to the concavities and convexities is small and, thus, there is a fear of occurrence of the unevenness, and, if the refractive index ratio is larger than the above-described range, there is a fear that the contrast is lowered due to reflection of the external light on the concave-convex surface.

In addition, for each of the above-described refractive indices, reference shall be made to a literature data of the material to be used.

The refractive index of the material which constitutes the light diffusion layer refers to the refractive index of the binder when the light diffusion layer comprises the light diffusion particles and the binder, and to the refractive index of the constituent material of the light diffusion layer when the light diffusion layer does not contain the light diffusion particles.

Here, in the case of the interfacial diffusion, the layer which is in contact with the light diffusion layer 5 includes the fusion bonding layer 3 (FIG. 3), the second fusion bonding layer 6 (FIG. 3, FIG. 6, and FIG. 8), the light-absorbing layer 8 (FIG. 7 and FIG. 8), and the like. The refractive index of the material which constitutes the fusion bonding layer refers to the refractive index of the thermoplastic resin contained in the fusion bonding layer. Similarly, the refractive index of the material which constitutes the second fusion bonding layer refers to the refractive index of the thermoplastic resin contained in the second fusion bonding layer.

In the case of the interfacial diffusion, as will be described later, the light diffusion layer is preferably placed in the proximity of the liquid crystal panel in order to suppress occurrence of a double image. Therefore, when arbitrary layers are in contact with both sides of the light diffusion layer, it is preferable that the refractive index ratio of the material which constitutes the light diffusion layer and the material which constitutes the layer being in contact with the liquid crystal panel side of the light diffusion layer satisfies the above-mentioned refractive index ratio. For example, as shown in FIG. 3, when the light diffusion layer 5 is in contact with the fusion bonding layer 3 and the second fusion bonding layer 6, the second fusion bonding layer 6 is in contact with the liquid crystal panel 20 side of the light diffusion layer 5 and, therefore, it is preferable that the refractive index ratio of the material which constitutes the light diffusion layer and the thermoplastic resin contained in the second fusion bonding layer satisfies the above-mentioned refractive index ratio. Also, as exemplified in FIG. 8, when the light diffusion layer 5 is in contact with the light-absorbing layer 8 and the second fusion bonding layer 6, it is preferable that the refractive index ratio of the material which constitutes the light diffusion layer and the thermoplastic resin contained in the second fusion bonding layer satisfies the above-mentioned refractive index ratio.

The refractive index of each of the material which constitutes the light diffusion layer and the material which constitutes the layer being in contact with the light diffusion layer is not particularly limited as long as the above-described refractive index ratio is satisfied. The refractive index of the material which constitutes the light diffusion layer may be higher or may be lower than the refractive index of the material which constitutes the layer being in contact with the light diffusion layer.

In the present invention, the transparent substrate may serve also as the light diffusion layer, the fusion bonding layer may serve also as the light diffusion layer, or the second fusion bonding layer may serve also as the light diffusion layer. Alternatively, the light diffusion layer may be installed separately from the transparent substrate, the fusion bonding layer, and the second fusion bonding layer. For example, when the fusion bonding layer is placed directly on the liquid crystal panel, the fusion bonding layer 3 may serve also as the light diffusion layer 5 as exemplified in FIG. 2, or the transparent substrate 2 may serve also as the light diffusion layer 5 as exemplified in FIG. 3. Furthermore, when the second fusion bonding layer is placed directly on the liquid crystal panel, the second fusion bonding layer 6 may serve also as the light diffusion layer 5 as exemplified in FIG. 5 and FIG. 7, or the light diffusion layer 5 may be placed separately as shown in FIG. 6 and FIG. 8, and, although not shown in the drawing, the fusion bonding layer may serve also as the light diffusion layer or the transparent substrate may serve as the light diffusion layer.

When the transparent substrate serves also as the light diffusion layer, both of the particle diffusion and interfacial diffusion may be applied. When the fusion bonding layer or the second fusion bonding layer serves also as the light diffusion layer, only the particle diffusion can be applied because the fusion bonding layer or the second fusion bonding layer is melted when bonding the liquid crystal panel and the transparent substrate.

When the light diffusion layer is one having the light diffusion particles dispersed in a binder and when, at the same time, the fusion bonding layer or the second fusion bonding layer serves also as the light diffusion layer, the binder corresponds to the thermoplastic resin contained in the fusion bonding layer or the second fusion bonding layer. Further, when the transparent substrate serves also as the light diffusion layer, the binder corresponds to glass or a resin contained in the transparent substrate. Furthermore, when the light diffusion layer is installed separately from the transparent substrate, the fusion bonding layer, the second fusion bonding layer, and the like, the binder corresponds to the resin contained in the light diffusion layer.

It is noted that description of the thermoplastic resin contained in the fusion bonding layer or the second fusion bonding layer and the glass or the resin contained in the transparent substrate will be omitted here, because they were described in the above-described sections on the fusion bonding layer, the second fusion bonding layer, and the transparent substrate.

When the light diffusion layer is installed separately from the transparent substrate, the fusion bonding layer, the second fusion bonding layer, and the like, the resin contained in the above-described light diffusion layer is not particularly limited as long as it has transparency. There may be used, for example, a fluorine resin, a silicone resin, an acrylic resin, a benzoguanamine resin, an ethylene resin, a styrene resin, a phenol resin, an imide resin, an epoxy resin, an amino resin, a urethane resin, a vinyl resin, a cellulose resin, and copolymers of the above-mentioned resins.

Even when the light diffusion layer does not contain the light diffusion particles, these resins may be used for the light diffusion layer.

When the light diffusion layer comprises the light diffusion particles, it is also preferable that the above-mentioned binder comprises highly-refractive-index ultrafine particles or low-refractive-index ultrafine articles, both having an average particle size in a range of 1 nm to 300 nm, for a purpose of adjusting the refractive index. Also, when the light diffusion layer does not contain the light diffusion particles, it is preferable that the above-mentioned resin likewise comprises the above-mentioned highly-refractive-index ultrafine particles or the low-refractive-index ultrafine particles.

The highly-refractive-index ultrafine particles include ZnO (refractive index, 1.90), $TiO_2$ (refractive index, 2.3 to 2.7), $CeO_2$ (refractive index, 1.95), $Sb_2O_5$ (refractive index, 1.71), $SnO_2$, ITO (refractive index, 1.95), $Y_2O_3$ (refractive index, 1.87), $La_2O_3$ (refractive index, 1.95), $ZrO_2$ (refractive index, 2.05) $Al_2O_3$ (refractive index, 1.63), and the like. The low-refractive-index ultrafine particles include silica fine particles; hollow silica fine particles; fine particles of fluorides such as magnesium fluoride, lithium fluoride, aluminum fluoride, calcium fluoride, and sodium fluoride; and the like.

The above is because, in the case of the interfacial diffusion, the refractive index ratio of the binder or the resin contained in the light diffusion layer and the material which constitutes the layer being in contact with the light diffusion layer can be increased by adjusting the refractive index of the binder or the resin. Thereby, it becomes possible to diffuse light more effectively by the concavities and convexities on a surface of the light diffusion layer. In addition, the above is because, in the case of both particle diffusion and interfacial diffusion, the refractive index ratio of the binder and the light diffusion particles can be decreased by adjusting the refractive index of the binder. Thereby, it becomes possible to reduce lowering of the contrast while preventing the glare.

The light diffusion particles are not particularly limited as long as the refractive index thereof is different from that of the binder and the particles have transparency, and are suitably selected depending on the kind of the binder. Specifically, the particles include inorganic particles such as silicon oxide and aluminum oxide; organic particles such as silicone-based resins, acrylic-based resins, divinylbenzene-based resins, benzoguanamine-based resins, styrene-based resins, melamine-based resins, acryl-styrene-based resins, polycarbonate-based resins, polyethylene-based resins, polyvinyl chloride-based resins, and polymethyl methacrylate-based resins; a mixture of two or more kinds of these; or the like.

Further, as for the average particle size of the light diffusion particles, when the light diffusion layer has an internal diffusion function due to both of the particle diffusion and the interfacial diffusion, the lower limit of the average particle size of the light diffusion particles is, relative to the thickness of the light diffusion layer which is set as 1, preferably 0.3 or more, above all preferably 0.6 or more, and especially preferably 0.8 or more. This is because the concave-convex surface can be formed more reliably on a surface of the light diffusion layer. On the other hand, when the thickness of the light diffusion layer is set as 1, the upper limit of the average particle size of the light diffusion particles is preferably 3 or less, and more preferably 2 or less. This is in order to prevent entrainment of air bubbles during the process of bonding the liquid crystal panel and the transparent substrate. Specifically, the average particle size of the light diffusion particles is preferably in a range of 0.5 μm to 15 μm, above all preferably in a range of 1.0 μm to 10 μm, and especially preferably in a range of 2 μm to 8 μm. This is because, if the average particle size is smaller than the above-described range, the particle diffusion becomes inferior and, if the average particle size is larger than the above-described range, the effect to prevent glare is reduced.

Meanwhile, the above-described average particle size means a primary particle size when individual particles are dispersed and a secondary particle size when individual particles are aggregated.

Here, the average particle size is generally used to show the grain size of the particles and can be measured by a light scattering method or an electron microscopic picture. In the present invention, the average particle size is defined as the value measured by a laser method. The laser method is a method where the particles are dispersed in a solvent, a laser beam is irradiated on the dispersion solvent and scattered light thereby obtained is narrowed, and calculation is carried out to measure the average particle size, the particle size distribution, and the like. In addition, the above-described average particle size is a value measured by using Microtrack UPA Model-9230™, a particle size analyzer manufactured by Leeds & Northrup Co. UK., as a particle size measuring instrument based on the laser method.

The shape of the light diffusion particles is not particularly limited but, in the case of particles having a primary particle size of 0.5 μm or more, the shape is preferably spherical. This is because, if the shape is indeterminate, there is a fear that reflection of the external light becomes stronger to lower the contrast and, also, there is a fear that the sharpness is lowered due to generation of stray light.

In the present invention, on the plane projected in the normal direction of the viewing-side surface of the liquid crystal panel, the sum of the in-plane projected area of the light diffusion particles contained in the light diffusion layer is preferably in a range of 8% to 63% of the total, above all preferably in a range of 15% to 53%, and especially preferably in a range of 23% to 42%. If the sum of the in-plane projected area of the light diffusion particles contained in the light diffusion layer is too small, probability of the light incident on the light diffusion layer to come into collision with the light diffusion particles becomes too low and, therefore, there are some cases where a light diffusing effect sufficient to prevent the glare cannot be obtained. On the other hand, if the sum of the in-plane projected area of the light diffusion particles contained in the light diffusion layer is too large, there is a fear that lowering of the contrast may occur due to reflection of the external light by the light diffusion particles.

Meanwhile, the in-plane projected area of the light diffusion particles contained in the light diffusion layer can be measured by a transmission electron microscope (TEM) observation of the light diffusion layer.

The content of the light diffusion particles contained in the light diffusion layer is not particularly limited as long as they are present in an amount sufficient for diffusing light. Because probability of the incident light to come into collision with the light diffusion particles depends on the thickness of the light diffusion layer, the preferable content of the light diffusion particles to obtain the above-described sum of the in-plane projected area of the light diffusion particles contained in the a light diffusion layer also depends on the thickness of the light diffusion layer. Therefore, the content of the light diffusion particles in the light diffusion layer based on 100 parts by weight of the binder in the light diffusion layer is, when the thickness of the light diffusion layer is denoted by T (μm), preferably in a range of 32/T parts by weight to 375/T parts by weight, above all preferably in a range of 63/T parts by weight to 312/T parts by weight, and especially preferably 94/T parts by weight to 250/T parts by weight.

Furthermore, in the present invention, when regular transmission intensity of the light diffusion layer is denoted by Q and a transmission intensity obtained by extrapolating straight lines which connect the transmission intensities at regular transmission ±2° and regular transmission ±1° to a regular transmission angle is denoted by U, a relationship:

$$2 < Q/U < 22$$

is preferably satisfied. That is, the content of the light diffusion particles in the light diffusion layer, the particle size of the light diffusion particles, the refractive index ratio of the light diffusion particles and the binder, the concavities and convexities on a surface of the light diffusion layer, the refractive index ratio of the material which constitutes the light diffusion layer and the material which constitutes the layer being in contact with the light diffusion layer, the positional relationship between the light diffusion particles and the concavities and convexities on a surface of the light diffusion layer are preferably adjusted to satisfy the above-described formula. By employing such a configuration, suppression of the uneven display and improvement in the vivid complexion and blackness may be balanced.

When Q/U is in the above-described range, there can be obtained an excellent image with high contrast and less glare. The reason for this is because the stray light component generated by the light diffusion particles and the interfacial concavities and convexities is reduced, while maintaining an appropriate degree of small diffusion of the picture light. In other words, (a) transmission diffusion is small (regular transmission intensity is high), and (b) large diffusion is reduced, and (c) the same is converted to a diffusion in the proximity of the regular transmission. Here, in the case of isotropic diffusion, diffusion intensity in the proximity of the regular transmission will be considered.

If layers with different distribution of diffuse transmission intensity are laminated, the rate of reduction of the diffuse transmission intensity is larger when the angle is closer to 0°. Therefore, if the regular transmission intensity (Q) is decreased, the diffusion intensity in the proximity of the regular transmission angle becomes larger. Furthermore, when distributions of the light diffusion particles and the interfacial concavities and convexities are sparse, intensity distribution of the diffusion property becomes equal to the sum of the diffusion intensity distribution due to the above-described diffusion factors and the two intensity distributions having only the regular transmission intensity without the presence of both of the above-described light diffusion particles and interfacial concavities and convexities. Regarding this intensity distribution, when the intensities obtained by extrapolating the slopes of intensities at ±1° and ±2° to the regular transmission angle are denoted as virtual regular transmission intensity (U), U corresponds to approximation of the regular transmission of the diffusion property due to the diffusion factors. Thus, Q/U represents the ratio of "the portion without the diffusion factors, Q" and "the regular transmission intensity, U, due to the diffusion factor portion." That is, Q/U, serves as a measure of the state of diffusion in the proximity of regular transmission.

In addition, by using a small-angle gonio-photometer, for example, the transmission intensity can be measured in 1° increments in a range of regular transmission ±45°, and Q and U can be calculated therefrom.

Regarding a thickness of the light diffusion layer, when a pixel pitch in the horizontal direction of the liquid crystal panel and the thickness of the light diffusion layer are denoted by P and T, respectively, a relationship:

$$T < P/2$$

is preferably satisfied. This is because, if the thickness of the light diffusion layer is too large, there is a fear that a double image may be generated, resulting in lowering in the image quality. When the thickness of the light diffusion layer satisfies the above-described formula, the double image becomes difficult to be observed in a range of viewing angle ±60°. Specifically, in a 20-inch liquid crystal display device, the thickness of the light diffusion layer is preferably 500 μm or less.

In addition, when there is a plurality of light diffusion layers, the above-described thickness of the light diffusion layer refers to the thickness of the light diffusion layer placed closest to the liquid crystal panel.

The placement of the light diffusion layer is acceptable as long as the layer is on the viewing-side of the liquid crystal panel and can be selected suitably. When the transparent substrate, the fusion bonding layer, or the second fusion bonding layer serves also as the light diffusion layer, the placement of the light diffusion layer is regarded as corresponding to that of each layer. When the light diffusion layer is installed separately from the transparent substrate, the fusion bonding layer, and the second fusion bonding layer, the light diffusion layer is placed between the fusion bonding layer and the second fusion bonding layer. Above all, as exemplified in FIG. 2, FIG. 5, and FIG. 7, the light diffusion layer 5 is preferably placed directly on the liquid crystal panel 20. That is the fusion bonding layer 3 or the second fusion bonding layer 6 preferably serves also as the light diffusion layer 5. Generally, the liquid crystal panel often has a light diffusion film placed on the outermost surface. Thus, if the distance between the liquid crystal panel and the light diffusion layer is large, there is a fear that a double image may be generated due to the light diffusion layer and the light diffusion film which the liquid crystal panel has. If the light diffusion layer is placed directly on the liquid crystal panel, the distance between the liquid crystal panel and the light diffusion layer can be shortened and thereby occurrence of the double image can be suppressed.

Meanwhile, when there is a plurality of light diffusion layers, the distance between the liquid crystal panel and the light diffusion layer refers to the distance between the viewing-side surface of the liquid crystal panel and the light diffusion layer placed closest to the liquid crystal panel.

5. Louver Layer

In the present invention, there may be placed a louver layer on the viewing side of the liquid crystal panel, the louver layer comprising strip-shaped transmitting portions and strip-shaped light-shielding portions which are arranged alternately. The louver layer comprises the strip-shaped transmitting portions and the strip-shaped light-shielding portions which are arranged alternately at regular intervals and the incident light at an incident angle equal to or larger than a certain value comes incident on and is absorbed by the light-shielding portion and cannot transmit through. Thus, only the light in a predefined range of incident angles is transmitted depending on the thickness of the louver layer, the distance between the light-shielding portions, and the angle formed by the light-shielding portions relative to the surface of the louver layer. Therefore, external light having a large incident angle can be restricted by the louver layer without shielding the display light. Accordingly, the oblique external light is blocked by the light-shielding portions of the louver layer and the amount of external light reflected on the display surface decreases, resulting in improvement in the contrast in the front direction.

The louver layer is acceptable as long as it comprises the strip-shaped transmitting portions and the strip-shaped light-shielding portions which are arranged alternately and there may be used a general louver layer.

It is preferable that the placement of the transmitting portions and the light-shielding portions of the louver layer with respect to the liquid crystal panel is suitably selected in accordance with the property of the louver layer used. Generally, in the liquid crystal display device, it is preferable that diffusion in the horizontal direction is made larger than diffusion in the vertical direction.

For example, a louver manufactured by 3M Company comprises a transparent layer and a light-shielding layer arranged in parallel and has no light diffusion function. Therefore, the transmitting portions and the light-shielding portions of the louver layer are preferably arranged alternately in the horizontal direction of the liquid crystal panel, so that the transparent layer (light-shielding layer) becomes aligned in the horizontal direction of the liquid crystal panel. This is because the louver layer can improve the contrast without narrowing the angle of view in the horizontal direction of the liquid crystal display device.

In addition, a louver manufactured by Dai Nippon Printing Co., Ltd. comprises a sphenoidal or trapezoidal light-shielding layer formed on a transparent film, with the space between the light-shielding portions being filled with a transparent resin and the louver having a light-diffusion function due to the oblique side of the wedge or the trapezoid. Thus, it is preferable to arrange the transmitting portions and the light-shielding portions of the louver layer alternately in the vertical direction of the liquid crystal panel, so that the light-shielding layer is placed in the vertical direction of the liquid crystal panel. This is because the angle of view in the horizontal direction of the liquid crystal display device can be made wider, while improving the contrast.

Further, in a louver having a light focusing function, it is preferable to arrange the transmitting portions and the light-shielding portions of the louver layer so that the light is condensed in the vertical direction, resulting in enhanced frontal brightness.

Furthermore, as another example of modification, the louver layer can be used in such a way that it is placed with the light-shielding portions becoming oblique, thereby making the angle of transmission (light shielding) different in the vertical direction (horizontal direction), which is expected to coincident with the direction in which one hopes to expand the watching range (for example, in the case of a television, the viewing angle is broadened in the upward direction and is narrowed in the downward direction).

When the louver layer does not possess the diffusing function, the maximum angle at which light can exit from the transmitting portions of the louver layer is preferably 45° or more with respect to the normal direction of the viewing-side surface of the louver layer. That is, it is preferable that the thickness of the louver layer, the distance between the light-shielding portions, and the angle formed by the light-shielding portions with respect to the surface of the louver layer are adjusted so that the above-described maximum angle becomes 45° or more. This is because the external light can be absorbed and a usual watching region in the vertical direction of the liquid crystal display device can be secured. Further, if the above-described maximum angle is in the above-described range, leaking of light due to a polarizer which constitutes the liquid crystal panel can be prevented and, at the same time, the external light can be shielded effectively to improve the contrast.

The thickness of the louver layer is not particularly limited as long as the above-described maximum angle can be kept in the predefined range.

The placement of the louver layer is acceptable as long as it is on the viewing side of the liquid crystal panel. Above all, when the light diffusion layer has been formed, the louver layer is preferably placed on the viewing side of the light diffusion layer. This is because reduction of external light incident on the light diffusion layer makes it possible to suppress reflection by the light diffusion layer and because a stray light component of the image light, generated by the light diffusion layer, is absorbed. These are preferable for improvement of the contrast.

In the present invention, the transparent substrate may also serve as the louver layer, or the fusion bonding layer or the second fusion bonding layer may also serve as the louver layer. Alternatively, there may be installed a louver layer separately from the transparent substrate, fusion bonding layer, and the second fusion bonding layer. Above all, it is preferable that the louver layer is installed separately from the transparent substrate, fusion bonding layer, and the second fusion bonding layer. This is because the transparent substrate having a louver function is expensive.

6. Light-Absorbing Layer

In the present invention, there may be placed a light-absorbing layer on the viewing side of the liquid crystal panel, the light-absorbing layer having an average light absorptance in a range of 1% to 30% in a wavelength range of 400 nm to 750 nm. The contrast and sharpness of the image can be improved. Furthermore, when the light-absorbing layer uses dyes and pigments which selectively absorb external light of specific wavelengths such that the layer transmits wavelengths of the image light and absorbs other wavelengths in the visible light range, it becomes possible to improve the contrast while keeping brilliance of the image light. Further, when the light-absorbing layer is placed on the viewing side of the light diffusion layer, the external light is absorbed by the light-absorbing layer and reduces the amount of light incident on the light diffusion layer and, at the same time, the external light reflected by the light diffusion layer is again absorbed by the light-absorbing layer. Thereby, the contrast can be improved more effectively.

The light-absorbing layer is acceptable as long as the average light absorptance thereof in a wavelength range of 400 nm to 750 nm is in a range of 1% to 30%, where the absorptance is above all preferably in a range of 4% to 25%, and especially preferably in a range of 5% to 20%. If the average light absorptance is less than the above-described range, the effect of improvement of the contrast by absorption of the external light is low and, if the average light absorptance is more than the above-described range, lowering of the image brightness due to absorption of the image light is too large. If the average light absorptance is in the range of 4% to 25%, especially in the range of 5% to 20%, the above-described effect can be made more certain.

In addition, the above-described average light absorptance can be measured, for example, by a spectral transmittance meter.

Further, the light-absorbing layer preferably has a so-called selective absorption function where light absorptance for wavelengths corresponding to the emission wavelengths of the image light projected from the liquid crystal display device is low (the transmittance is high) and light absorptance for other wavelengths is high (transmittance is low). That is, the light-absorbing layer preferably has a selective light-absorption property to absorb wavelengths other than the predefine wavelengths belonging to the image light itself. This is because, while the external light contains a full range of wavelengths, the image light has only specified wavelengths (for example, it is general to use red, green, and blue which are the three primary colors of light) and, therefore, when the light-absorbing layer has a selective absorption function, attenuation of the image light by the light-absorbing layer is suppressed and absorption of the external light is increased, enabling the contrast to be further improved.

When the light-absorbing layer has a selective absorption function, the liquid crystal display device of the present invention above all preferably employs, as the backlight, LED light sources each having a different wavelength and, more preferably, is a liquid crystal display device employing a field-sequential method which drives the liquid crystal display device in synchronism with the emission wavelength of the LED light sources. That is, when the liquid crystal display device of the present invention is driven by the field-sequential method using LED light sources, it is preferable that the light-absorbing layer has been formed. The LED light source having a single wavelength can broaden the wavelength range of selective absorption by the light-absorbing layer. Thus, when a field-sequential method using LED light sources is employed without using a color filter, the image light itself possesses the predefined wavelengths and, therefore, the range of wavelengths absorbed selectively by the light-absorbing layer can be further broadened. In this case, the contrast can be improved more.

The material of the light-absorbing layer is not particularly limited as long as the above-described average light absorptance is satisfied and includes black dyes such as aniline black; black pigments such as carbon black, acetylene black, lamp-black, and mineral black; and the like.

Furthermore, as the material having selective transparency, there may be used a material having high transmittance for light of wavelengths corresponding to the high brightness range of the image light and having low transmittance for light of other wavelengths. Such a material includes, for example, xanthene-based dyes, anthraquinone-based dyes, phthalocyanine-based dyes, triphenolmethane-based dyes, azo-based dyes, indigoid-based dyes, carbonium ion-based dyes, pigments, and metal chelates of neodymium and the like. These materials may be used as a mixture or as a laminate.

The thickness of the light-absorbing layer is not particularly limited as long as the above-described average light absorptance is satisfied.

The placement of the light-absorbing layer is acceptable as long as it is placed on the viewing side of the liquid crystal panel. However, when there is a light diffusion layer formed, the light-absorbing layer is above all preferably placed on the viewing side of the light diffusion layer. This is because, as mentioned above, the external light is absorbed by the light-absorbing layer resulting in decrease in the amount of light incident on the light diffusion layer and, at the same time, the external light reflected by the light diffusion layer is absorbed again by the light-absorbing layer, enabling the contrast to be improved more effectively.

In the present invention, the transparent substrate may serve also as the light-absorbing layer, or the fusion bonding layer or the second fusion bonding layer may serve also as the light-absorbing layer. Also, there may be installed a light-absorbing layer separately from the transparent substrate, the fusion bonding layer, and the second fusion bonding layer.

7. Liquid Crystal Panel

The liquid crystal panel in the present invention has a transparent substrate bonded to the viewing-side surface with a fusion bonding layer interposed therebetween.

As exemplified in FIG. 1, the liquid crystal panel 20 comprises a liquid crystal cell 21, a viewing-side polarizer 22a placed on the viewing side 10 of the liquid crystal cell 21, a back-side polarizer 22b placed on the back side of the liquid crystal cell 21, and a functional film 23 such as an anti-glare film and an anti-reflection film, placed on the viewing side 10 of the viewing-side polarizer 22a. The liquid crystal cell 21 comprises, though not shown in the drawing, a pair of supporting plates, the liquid crystal sandwiched between the supporting plates, an alignment film which aligns liquid crystal molecules, electrodes which regulate alignment of the liquid crystal molecules by an electric field, and a color filter.

It is noted that description of the liquid crystal panel will be omitted here, because there can be used a general liquid crystal panel.

8. Other Members

In the present invention, in addition to the above-mentioned light diffusion layer, the louver layer, and functional layers such as the light-absorbing layer, there may be placed a functional layer having an arbitrary function on the viewing side of the liquid crystal panel.

For example, with the purpose of improving impact resistance, there may be placed an impact-absorbing layer between the liquid crystal panel and the transparent substrate, the impact-absorbing layer having a dynamic storage elastic modulus in a range of $9 \times 10^4$ Pa to $4 \times 10^6$ Pa under conditions of 25° C. and 1000 Hz to 10000 Hz.

The above-mentioned members may serve also as the impact-absorbing layer, or the latter may be a layer installed anew.

When the above-mentioned members serve also as the impact-absorbing layer, impact absorption may be achieved by adding a compound which increases the dipole moment. The compound which increases the dipole moment includes compounds containing a mercaptobenzothiazyl group, such as N,N-dicyclohexylbenzothiazyl-2-sulphenamide (DCHBSA), 2-mercaptobenzothiazole (MBT), dibenzothiazyl sulfide (MBTS), N-cyclohexylbenzothiazyl-2-suphenamide (CBS), N-tert-butylbenzothiazyl-2-sulphenamide (BBS), N-oxydiethylenebenzothiazyl-2-sulphenamide (OBS), and N,N-diisopropylbenzothiazyl-2-sulphenamide (DPBS); compounds containing a benzotriazole group obtained by bonding a phenyl group to benzotriazle, a mother nucleus which is obtained by bonding an azole group to a benzene ring, including 2-{2'-hydroxy-3'-(3",4",5",6"-tetrahydrophthalimidemethyl)-5'-methylphenyl}-benzotriazole (2HPMMB), 2-{2'-hydroxy-5'-methylphenyl}-benzotriazole (2HMPB), 2-{2'-hydroxy-3'-t-butyl-5'-methylphenyl}-5-chlorobenzotriazole ole (2HBMPOCB), and 2-{2'-hydroxy-3',5'-di-t-butylphenyl}-5-chlorobenzotriazole (2HDBPCB); compounds containing diphenylacrylate group such as ethyl-2-cyano-3,3-diphenylacrylate; or the like.

In addition, in the present invention, the above-mentioned various functional layers may be combined in any way.

9. Method for Manufacturing Liquid Crystal Display Device

The liquid crystal display device of the present invention is preferably fabricated, for example, by using a lamination method where a liquid crystal panel, a sheet-like or film-like fusion bonding layer, and a transparent substrate is bonded under pressure and heat. This is because a liquid crystal display device having good impact resistance can be obtained by a simple method without causing lowering in the display quality.

For example, in the case of a liquid crystal display device 1 shown in each of FIG. 2 and FIG. 4, the liquid crystal panel 20, the sheet-like or film-like fusion bonding layer 3, and the transparent substrate 2 are laminated sequentially, and these are bonded under pressure and heat to fabricate a liquid crystal display device. In the case of a liquid crystal display device 1 exemplified in FIG. 3, the liquid crystal panel 20, the sheet-like or film-like second fusion bonding layer 6, and the light diffusion layer 5, the sheet-like or film-like fusion bonding layer 3, and the transparent substrate 2 are laminated sequentially, and these are bonded under pressure and heat to fabricate a liquid crystal display device.

When the fusion bonding layer and various functional layers are laminated, these are more preferably used as a laminate of the fusion bonding layer and various functional layers prepared beforehand. This is in order to decrease loss of expensive liquid crystal display devices due to breakage and the like by decreasing the number of processes in manufacturing the liquid crystal display device.

The present invention is not limited to the above-described embodiments. The above-described embodiments are illustrations and any embodiment having substantially the same constitution as the technical idea described in the claims of the present invention and exhibiting the same effects are included in the technical scope of the present invention.

EXAMPLES

Hereinafter, the present invention will be described specifically with reference to Examples.

Example 1

(1) Preparation of Thermoplastic Resin

To a vinyl acetate copolymer (vinyl acetate content: 28 weight %, MFR: 15 g/10 minutes), there were added 0.3 weight part of a silane coupling agent (methacryloxypropyltrimethoxysilane) and, further, 0.2 weight part of an antioxidant. The mixture was kneaded to obtain a thermoplastic resin.

(2) Manufacture of Fusion Bonding Film

The above-described thermoplastic resin was molded using a 150 mmφ extruder and a film molding machine with a 1000 mm wide T dice at a resin temperature of 90° C. and at a take-up speed of 5 m/min to obtain a 300 µm thick film-like fusion bonding layer.

(3) Bonding of Glass Substrate/Fusion Bonding Film/Liquid Crystal Panel

The above-described fusion bonding film was sandwiched between a glass plate (922 mm×542 mm) and a liquid crystal panel (920 mm×540 mm) with a horizontal pixel pitch of 0.2 mm, the liquid crystal panel being positioned within the periphery of the glass plate, and laminated under vacuum to fabricate a liquid crystal display device. The specific fabrication method is as follows.

That is, first, on a release sheet placed on a laminating machine, there were sequentially laminated a blue sheet glass (thickness: 3 mm), the above-described fusion bonding film (thickness: 300 µm), the above-described liquid crystal panel, and a release sheet. Subsequently, the laminating machine was set for a preset temperature of 90° C. and, after putting down the lid, the sample was evacuated, and the temperature was raised to 70° C. After raising the temperature, the pressure of the upper chamber was set at 30 KPa, and the laminate was pressed with a diaphragm sheet placed between the upper and lower chambers of the vacuum laminating machine and kept under the same condition for 5 minutes. Finally, both of the upper and lower chambers were opened to the air and the peripheral part of the laminate of glass substrate/fusion bonding film/liquid crystal panel was fixed in a frame with an inner size of 922 mm×542 mm. Thus, a liquid crystal display device was fabricated.

Example 2

(1) Preparation of Thermoplastic Resin

To a vinyl acetate copolymer (vinyl acetate content: 10 weight %, MFR: 25 g/10 minutes), there were added 0.3 weight part of a silane coupling agent (methacryloxypropyltrimethoxysilane) and, further, 0.2 weight part of an antioxidant. The mixture was kneaded to obtain a thermoplastic resin with a refractive index of 1.462.

(2) Manufacture of Fusion Bonding Film

The above-described thermoplastic resin was molded using a 150 mmϕ extruder and a film molding machine with a 1000 mm wide T dice at a resin temperature of 120° C. and at a take-up speed of 30 m/min to obtain a 50 μm thick film-like fusion bonding layer.

(3) Manufacture of Fusion Bonding Film/Film with Light Diffusion Layer/Fusion Bonding Film First, a resin composition for a light diffusion layer, comprising 27.5 weight parts of acryl-styrene beads (particle size: 4 μm, refractive index: 1.520) added to 100 weight parts of a UV curable resin (refractive index: 1.520), was coated on one side of a polyester film (thickness: 80 μm) in a dried film thickness of 5 μm and was cured to form a light diffusion layer. Then, on both sides of the film with the light diffusion layer, the above-described fusion bonding film (thickness: 50 μm) was laminated using a two-component curable ester-based resin adhesive (refractive index: 1.462) by means of a dry lamination method to fabricate a laminate of fusion bonding film/film with a light diffusion layer/fusion bonding film.

(4) Bonding of Glass Substrate/Fusion Bonding Sheet/Liquid Crystal Panel

A liquid crystal display device was fabricated in accordance with the method of Example 1 (4) for bonding the glass substrate/fusion bonding film/liquid crystal panel, except that the laminate of fusion bonding film/film with a light diffusion layer/fusion bonding film was used instead of the fusion bonding film, with the film with a light diffusion layer being placed so that the light diffusing layer faced the liquid crystal panel side.

Example 3

A liquid crystal display device was fabricated in the same manner as in Example 2 except that, in preparation of the film with a light diffusion layer of Example 2, acryl-styrene beads having a refractive index of 1.525 were used.

Example 4

A liquid crystal display device was fabricated in the same manner as in Example 2 except that, in preparation of the film with a light diffusion layer of Example 2, acryl-styrene beads with a refractive index of 1.558 were used.

Example 5

A liquid crystal display device was fabricated in the same manner as in Example 2 except that, in preparation of the film with a light diffusion layer of Example 2, the refractive index of the UV curable resin was adjusted to 1.462 by adding magnesium fluoride powder (particle size: 4 nm) to the resin and that silicon beads (particle size: 4 μm, refractive index: 1.458) were used instead of the acryl-styrene beads.

Example 6

A liquid crystal display device was fabricated in the same manner as in Example 2 except that, in Example 2, the film with a light diffusion layer was prepared as described in the following.

First, a mold having an inverted shape of the surface concavities and convexities of Example 2 was fabricated by coating and curing a silicon mold-making agent to obtain a transcriptional body having a surface concavities and convexities for forming a light diffusion layer, on which nickel electroforming was carried out twice. Then, a film with a light diffusion layer of 5 μm thickness was obtained by interposing a resin composition for a light diffusion layer, comprising 3.2 weight parts of acryl-styrene beads (particle size: 4 μm, refractive index: 1.525) added to 100 weight parts of a UV curable resin (refractive index: 1.520) between the above-described mold and a polyester film (thickness: 80 μm) and, after UV irradiation from the polyester side, by peeling the film from the above-described mold.

Example 7

A liquid crystal display device was fabricated in the same manner as in Example 3 except that, in Example 3, the amount of addition of the acryl-styrene beads was changed to 53 weight parts.

Example 8

A liquid crystal display device was fabricated in the same manner as in Example 2 except that, in Example 2, the film with a light diffusion layer was prepared as described in the following.

A resin composition for the light diffusion layer, comprising 13.75 weight parts of acryl-styrene beads (particle size: 4 μm, refractive index: 1.525) added to 100 weight parts of a UV curable resin (refractive index: 1.520), was coated on both sides of a polyester film (thickness: 150 μm) in a dried film thickness of 5 μm and cured to form a light diffusion layer.

Example 9

A liquid crystal display device was fabricated in the same manner as in Example 3 except that, in Example 3, when the fusion bonding film which comes in contact with the light diffusing layer of the film with a light diffusion layer was prepared, a carbon pigment was added to the thermoplastic resin so that the average light absorptance became 15%.

Example 10

A liquid crystal display device was fabricated in the same manner as in Example 3 except that, in Example 3, when the fusion bonding film which comes in contact with the light diffusion layer of the film with a light diffusing layer was prepared, a carbon pigment was added to the thermoplastic resin so that the average light absorptance became 34%.

Example 11

A liquid crystal display device was fabricated in the same manner as in Example 1 except that the size of the glass substrate was changed to 918 mm×538 mm and that a frame with an inner size of 920 mm×540 mm was used.

Example 12

A liquid crystal display device was fabricated in the same manner as in Example 3 except that, in preparation of the film with a light diffusion layer of Example 3, a louver film (having a diffusion function in a direction perpendicular to the light-shielding layer, thickness: 80 μm) manufactured by Dai Nippon Printing Co., Ltd. was used in place of the polyester film and was placed so that the light-shielding layer extended in a horizontal direction of the liquid crystal panel.

Example 13

A liquid crystal display device was fabricated in the same manner as in Example 9 except that, in preparation of the film with a light diffusion layer in Example 9, a louver film (having a diffusion function in a direction perpendicular to the light-shielding layer, thickness: 80 μm) manufactured by Dai Nippon Printing Co., Ltd. was used in place of the polyester film and was placed so that the light-shielding layer extended in a vertical direction of the liquid crystal panel.

Example 14

A liquid crystal display device was fabricated in the same manner as in Example 1 except that, in Example 1, the peripheral part of the liquid crystal panel was fixed in a frame with an inner size of 920 mm×540 mm.

[Evaluation]

Results of evaluation of the liquid crystal display devices of Example 1 to Example 14 are shown in the following Table 1.

In-plane projected area of the light diffusion particles contained in the light diffusion layer was measured by using a transmission electron microscope (TEM).

Average light absorptance was measured by using a spectral transmittance meter.

Regular transmission intensity Q of a light diffusion layer and transmission intensity U obtained by extrapolating straight lines which connect transmission intensities at regular transmission ±2° and regular transmission ±1° to a regular transmission angle were calculated by measuring the transmission intensity in 1° increments by using a small-angle gonio-photometer in a range of regular transmission ±45°.

As for the unevenness, vivid complexion and blackness, glare, double image, contrast, brilliance, and angle of view, there were conducted sensory evaluations as follows: a liquid crystal display device was placed in a room under an environment of about 1,000 Lx illuminance, a DVD distributed by Media Factory, Inc., entitled "The Phantom of the Opera," was displayed and, from a place about 1.5 m to 2.0 m away from the liquid crystal display device (liquid crystal television), the above-described video was watched for evaluation. The evaluation criteria were as follows:

⊚: especially good result;
○: good result;
Δ: close to make a viewer feel uncomfortable; and
X: makes a viewer feel uncomfortable.

In addition, regarding image disturbances, a sensory evaluation was conducted to see whether or not the liquid crystal screen varied in degree of coloration when the center of the liquid crystal display device was pressed.

TABLE 1

| | Refractive index ratio | | Average | | | | | | | | | | |
|---|---|---|---|---|---|---|---|---|---|---|---|---|---|
| | Binder and light diffusion particles | Thermoplastic resin and UV curable resin (concave-convex shape interface) | In-plane projected area (%) | light absorptance (%) | Q/U | Unevenness | Image disturbance | Vivid complexion and blackness | Glare | Double image | Contrast | Brilliance | Angle of view |
| Example 1 | — | — | — | — | — | Δ | ○ | ⊚ | Δ | ⊚ | ○ | ○ | ○ |
| Example 2 | 1.000 | 1.040 | — | 0 | 19 | ○ | ○ | ○ | Δ | ○ | ○ | ○ | ○ |
| Example 3 | 1.003 | 1.040 | 36 | 0 | 16 | ○ | ○ | ○ | ○ | ○ | ○ | ○ | ○ |
| Example 4 | 1.025 | 1.040 | 36 | 0 | 8 | ○ | ○ | ○ | ○ | ○ | Δ | ○ | ○ |
| Example 5 | 1.003 | 1.000 | 36 | 0 | 21 | Δ | ○ | ○ | ○ | ○ | ○ | ○ | ○ |
| Example 6 | 1.003 | 1.040 | 5 | 0 | 23 | ○ | ○ | ○ | Δ | ○ | ○ | ○ | ○ |
| Example 7 | 1.003 | 1.040 | 67 | 0 | 1.8 | ○ | ○ | Δ | ○ | ○ | Δ | ○ | ○ |
| Example 8 | 1.003 | 1.040 | 36 | 0 | 16 | ○ | ○ | ○ | ○ | Δ | ○ | ○ | ○ |
| Example 9 | 1.003 | 1.040 | 36 | 15 | 16 | ○ | ○ | ○ | ○ | ○ | ⊚ | ○ | ○ |
| Example 10 | 1.003 | 1.040 | 36 | 34 | 16 | ○ | ○ | ○ | ○ | ○ | ⊚ | Δ | ○ |
| Example 11 | — | — | — | — | — | Δ | Δ | ⊚ | Δ | ⊚ | ○ | ○ | ○ |
| Example 12 | 1.003 | 1.040 | 36 | 0 | 16 | ○ | ○ | ⊚ | ○ | ○ | ⊚ | ⊚ | ⊚ |
| Example 13 | 1.003 | 1.040 | 36 | 15 | 16 | ○ | ○ | ⊚ | ○ | ○ | ⊚ | ⊚ | ⊚ |
| Example 14 | — | — | — | — | — | ○ | X | ⊚ | ○ | ⊚ | ○ | ○ | ○ |

[Reference Numerals]
1 . . . Liquid crystal display device
2 . . . Transparent substrate
3 . . . Fusion bonding layer
5 . . . Light diffusion layer
6 . . . Second fusion bonding layer
7 . . . Louver layer
7a . . . Transmitting portion
7b . . . Light-shielding portion
8 . . . Light-absorbing layer
10 . . . Viewing side
20 . . . Liquid crystal panel
21 . . . Liquid crystal cell
22a . . . Viewing-side polarizer
22b . . . Back-side polarizer
23 . . . Functional film
31 . . . Backlight unit
32 . . . Housing

The invention claimed is:

1. A liquid crystal display device comprising a liquid crystal panel, a transparent substrate having rigidity, and a fusion bonding layer comprising a thermoplastic resin,
wherein the transparent substrate is bonded to a viewing-side surface of the liquid crystal panel with the fusion bonding layer interposed therebetween, and
when a vertical length and a horizontal length of the liquid crystal panel are denoted by $L_1$ and $W_1$, respectively, and a vertical length and a horizontal length of the transparent substrate are denoted by $L_2$ and $W_2$, respectively, relationships:

$$L_1 \leq L_2 \text{ and } W_1 \leq W_2$$

are satisfied.

2. The liquid crystal display device according to claim 1, wherein the transparent substrate is a glass substrate.

3. The liquid crystal display device according to claim 1, wherein a thickness of the transparent substrate is in a range of 0.5 mm to 4 mm.

4. The liquid crystal display device according to claim 1, wherein a thickness of the fusion bonding layer is in a range of 0.05 mm to 0.5 mm.

5. The liquid crystal display device according to claim 1, wherein the fusion bonding layer comprises a cross-linking agent.

6. The liquid crystal display device according to claim 1, wherein a sheet-like or film-like fusion bonding layer having a concave-convex shape on a surface is used as the fusion bonding layer.

7. The liquid crystal display device according to claim 1, wherein a light diffusion layer is placed on a viewing side of the liquid crystal panel.

8. The liquid crystal display device according to claim 7, wherein the light diffusion layer comprises a light diffusion particle and a binder.

9. The liquid crystal display device according to claim 8, wherein a ratio of one having a smaller refractive index to the other having a larger refractive index among the light diffusion particle and the binder is in a range of more than 1.000 and less than 1.020.

10. The liquid crystal display device according to claim 9, wherein the light diffusion layer comprises a highly-refractive ultrafine particle or a low-refractive ultrafine particle.

11. The liquid crystal display device according to claim 8, wherein the fusion bonding layer comprises the light diffusion particle and serves also as the light diffusion layer.

12. The liquid crystal display device according to claim 8, wherein, on a plane projected in a normal direction of the viewing-side surface of the liquid crystal panel, sum of an in-plane projected area of the light diffusion particle contained in the light diffusion layer is in a range of 8% to 63% of the total.

13. The liquid crystal display device according to claim 7, wherein the light diffusion layer comprises a concave-convex shape on a surface.

14. The liquid crystal display device according to claim 7, wherein a second fusion bonding layer comprising a thermoplastic resin and the light diffusion layer are placed sequentially between the liquid crystal panel and the fusion bonding layer.

15. The liquid crystal display device according to claim 14, wherein the light diffusion layer and the second fusion bonding layer are in contact, the light diffusion layer having a concave-convex shape on a surface facing the second fusion bonding layer, and a refractive index ratio of a material constituting the light diffusion layer and the thermoplastic resin contained In the second fusion bonding layer is in a range of 1.010 or more and less than 1.300.

16. The liquid crystal display device according to claim 15, wherein the second fusion bonding layer comprises a highly-refractive ultrafine particle or a low-refractive ultrafine particle.

17. The liquid crystal display device according to claim 7, wherein, when a regular transmission intensity of the light diffusion layer is denoted by Q and a transmission intensity obtained by extrapolating straight lines that connect regular transmission intensities at regular transmission ±2° and regular transmission ±1° to a regular transmission angle is denoted by U, a relationship:

$$2<Q/U<22$$

is satisfied.

18. The liquid crystal display device according to claim 7, wherein, when a pixel pitch in a horizontal direction of the liquid crystal panel is denoted by P and a thickness of the light diffusion layer is denoted by T, a relationship:

$$T<P/2$$

is satisfied.

19. The liquid crystal display device according to claim 1, wherein a louver layer is placed on a viewing side of the liquid crystal panel, and the louver layer comprises a strip-shaped transmitting portion and a strip-shaped light-shielding portion which are arranged alternately.

20. The liquid crystal display device according to claim 19, wherein the transmitting portion and the light-shielding portion are arranged alternately in a horizontal direction of the liquid crystal panel.

21. The liquid crystal display device according to claim 20, wherein a maximum angle at which light exits from the transmitting portion of the louver layer is 45° or more with respect to a normal direction of a viewing-side surface of the louver layer.

22. The liquid crystal display device according to claim 19, wherein the transmitting portion and the light-shielding portion are arranged alternately in a vertical direction of the liquid crystal panel.

23. The liquid crystal display device according to claim 19, wherein a light diffusion layer is placed on the viewing side of the liquid crystal panel and the louver layer is placed on a viewing side of the light diffusion layer.

24. The liquid crystal display device according to claim 19, wherein a second fusion bonding layer comprising a thermoplastic resin and the louver layer are placed sequentially between the liquid crystal panel and the fusion bonding layer.

25. The liquid crystal display device according to claim 24, wherein a light diffusion layer comprising a light diffusion particle and a binder is placed on a viewing side of the liquid crystal panel, and the second fusion bonding layer comprises the light diffusion particle and serves also as the light diffusion layer.

26. The liquid crystal display device according to claim 25, wherein the second fusion bonding layer comprises a cross-linking agent.

27. The liquid crystal display device according to claim 25, wherein a sheet-like or film-like second fusion bonding layer having a concave-convex shape on a surface is used as the second fusion bonding layer.

28. The liquid crystal display device according to claim 1, wherein a light-absorbing layer is placed on a viewing side of the liquid crystal panel, and the light-absorbing layer has an average light absorptance in a range of 1% to 30% in a wavelength range of 400 nm to 750 nm.

29. The liquid crystal display device according to claim 28, wherein the light-absorbing layer has a selective absorption property of absorbing a wavelength other than a predefined wavelength which an image light itself has.

30. The liquid crystal display device according to claim 29, wherein a backlight comprises LED light sources each having a different wavelength and the liquid crystal display device employs a field sequential method which drives the liquid crystal display device in synchronism with an emission wavelength of the LED light source.

31. The liquid crystal display device according to claim 28, wherein a light diffusion layer is placed on a viewing side of the liquid crystal panel and the light-absorbing layer is placed on a viewing side of the light diffusion layer.

32. The liquid crystal display device according to claim 28, wherein the fusion bonding layer serves also as the light-absorbing layer.

33. The liquid crystal display device according to claim 28, wherein a second fusion bonding layer comprising a thermoplastic resin and the light-absorbing layer are placed sequentially between the liquid crystal panel and the fusion bonding layer.

34. The liquid crystal display device according to claim 1, wherein the thermoplastic resin is at least one kind of resin selected from the group consisting of polyvinyl acetals, polyolefins, an ethylene-vinyl acetate copolymer, a urethane resin, an epoxy resin, a silane-modified resin, and an acid-modified resin.

\* \* \* \* \*